US010789374B2

(12) United States Patent
Fujiwara et al.

(10) Patent No.: US 10,789,374 B2
(45) Date of Patent: Sep. 29, 2020

(54) DATABASE SYSTEM AND DATA RETRIEVAL METHOD

(71) Applicant: Hitachi, Ltd., Chiyoda-ku, Tokyo (JP)

(72) Inventors: Keisei Fujiwara, Tokyo (JP); Yumiko Yokohari, Tokyo (JP); Takayuki Suzuki, Tokyo (JP); Yoshinori Sato, Tokyo (JP); Masayuki Yoshino, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 202 days.

(21) Appl. No.: 16/080,286

(22) PCT Filed: Mar. 28, 2016

(86) PCT No.: PCT/JP2016/059994
§ 371 (c)(1),
(2) Date: Aug. 27, 2018

(87) PCT Pub. No.: WO2017/168535
PCT Pub. Date: Oct. 5, 2017

(65) Prior Publication Data
US 2019/0034646 A1  Jan. 31, 2019

(51) Int. Cl.
*H04L 29/06* (2006.01)
*G06F 21/60* (2013.01)
(Continued)

(52) U.S. Cl.
CPC .......... *G06F 21/602* (2013.01); *G06F 16/00* (2019.01); *G06F 16/24* (2019.01);
(Continued)

(58) Field of Classification Search
CPC ........ G06F 21/602; G06F 21/60; G06F 21/62; G06F 21/6227; G06F 16/27;
(Continued)

(56) References Cited

U.S. PATENT DOCUMENTS

2002/0038421 A1  3/2002  Hamada
2013/0191650 A1  7/2013  Balakrishnan et al.
(Continued)

FOREIGN PATENT DOCUMENTS

| JP | 2012-123614 A | 6/2012 |
| JP | 2013-025361 A | 2/2013 |
| JP | 2014-013582 A | 1/2014 |

OTHER PUBLICATIONS

Extended European Search Report for related European Application No. 16896755.2 dated Nov. 7, 2019; 9 pages.
(Continued)

*Primary Examiner* — Michael S McNally
(74) *Attorney, Agent, or Firm* — Procopio, Cory, Hargreaves & Savitch LLP

(57) ABSTRACT

A database system including: a database server for storing registration information including encrypted data encrypted using a probabilistic encryption method; and a terminal. The terminal includes: an encryption unit; a decryption unit; an encrypted search query generating unit for generating an encrypted search query obtained by encrypting a search query used for retrieving the encrypted data; and an additional processing unit for encrypting a search condition of a plaintext and transmitting a data acquisition request including the encrypted search condition. The database server holds database operation command definition information and search additional information. The database server includes: a database operation command generating unit for generating a database operation command by converting the data acquisition request on the basis of the database operation command definition information; and a database control unit for acquiring encrypted data satisfying the search condition by using the database operation command and the search additional information.

13 Claims, 25 Drawing Sheets

(51) Int. Cl.
  *G06F 21/62* (2013.01)
  *G06F 16/24* (2019.01)
  *G09C 1/00* (2006.01)
  *G06F 16/00* (2019.01)
  *G06F 16/27* (2019.01)
  *G06F 16/2455* (2019.01)
  *H04L 9/00* (2006.01)

(52) U.S. Cl.
  CPC .......... *G06F 16/2455* (2019.01); *G06F 16/27* (2019.01); *G06F 21/60* (2013.01); *G06F 21/62* (2013.01); *G09C 1/00* (2013.01); *H04L 9/008* (2013.01); *H04L 63/0428* (2013.01); *G06F 21/6227* (2013.01)

(58) Field of Classification Search
  CPC ...... G06F 16/2455; G06F 16/00; G06F 16/24; G09C 1/00; H04L 9/0428; H04L 63/0428
  USPC ........................................................ 713/193
  See application file for complete search history.

(56) References Cited

U.S. PATENT DOCUMENTS

2013/0246813 A1 9/2013 Mori et al.
2013/0262863 A1* 10/2013 Yoshino ................. H04L 9/008
  713/165

OTHER PUBLICATIONS

Nori Matsuda et al., "Efficient Searchable Encryption and Its Application to Web Services," Multimedia, Distributed, Cooperative, and Mobile (DICOMO 2013) Symposium, Jul. 2013, 10 pages.

* cited by examiner

FIG. 2

ENCRYPTED MAIN INFORMATION GROUP 461

ENCRYPTED PATIENT INFORMATION 4611

| ID | PATIENT NUMBER | NAME |
|---|---|---|
| 1 | Enc(0000001) | Enc(Suzuki) |
| 2 | Enc(0000002) | Enc(Sato) |
| 3 | Enc(0000003) | Enc(Fujiwara) |
| 4 | Enc(0000004) | Enc(Yoshino) |
| ⋮ | ⋮ | ⋮ |
| 1000000 | Enc(1000000) | Enc(Kojima) |

ENCRYPTED DIAGNOSIS INFORMATION 4612

| ID | PATIENT NUMBER | DISEASE NAME |
|---|---|---|
| 1 | Enc(0000002) | Enc(Hypertension) |
| 2 | Enc(0000004) | Enc(Gastroenteritis) |
| ⋮ | ⋮ | ⋮ |
| 200000 | Enc(1000000) | Enc(Diabetes) |

FIG. 3

DATABASE-SIDE ADDITIONAL INFORMATION GROUP 462

ENCRYPTED COMBINED INFORMATION 4621

| ID | PATIENT NUMBER | PATIENT NUMBER_QUERY | DISEASE NAME |
|---|---|---|---|
| 1 | Enc(0000002) | EncQuery(0000002) | Enc(Hypertension) |
| 2 | Enc(0000004) | EncQuery(0000004) | Enc(Gastroenteritis) |
| ⋮ | ⋮ | ⋮ | ⋮ |
| 200000 | Enc(1000000) | EncQuery(1000000) | Enc(Diabetes) |

FIG. 4

SQL DEFINITION INFORMATION 361

| DEFINITION ID 3611 | REQUEST PROCESSING 3612 | SQL DEFINITION 3613 |
|---|---|---|
| 1 | COMBINE | SELECT* FROM Table X JOIN Table Y<br>ON (Encryption Match Determination (Table X Column A, Table Z Column B_Query) = 1) |
| 2 | PARTIAL MATCH | SELECT Partial Match Row ID Acquisition (Like ID Information_xxx,<br>         Name_Partial Information Partial Match Search Query EQ);<br><br>SELECT Patient Number, Name FROM Encrypted Patient Information<br>JOIN LikeID Information_xxx<br>ON (Encrypted Patient Information. Row ID = LikeID Information_xxx. Row ID); |
| 3 | RANGE SEARCH | SELECT Patient Number, Name, Age<br>FROM Encrypted Patient Information Table<br>WHERE Encryption Match Determination (Age_Range Label,<br>                                 EncQuery (300)) = 'true')<br>OR Encryption Match Determination (Age_Range Label,<br>                                 EncQuery (400)) = 'true'); |
| ⋮ | ⋮ | ⋮ |

FIG. 5

MEMORY 410

TEMPORARY INFORMATION 4101

| PATIENT NUMBER | NAME | DISEASE NAME |
|---|---|---|
| Enc(0000002) | Enc(Sato) | Enc(Hypertension) |
| Enc(0000004) | Enc(Yoshino) | Enc(Gastroenteritis) |
| ⋮ | ⋮ | ⋮ |
| Enc(1000000) | Enc(Kojima) | Enc(Diabetes) |

FIG. 11
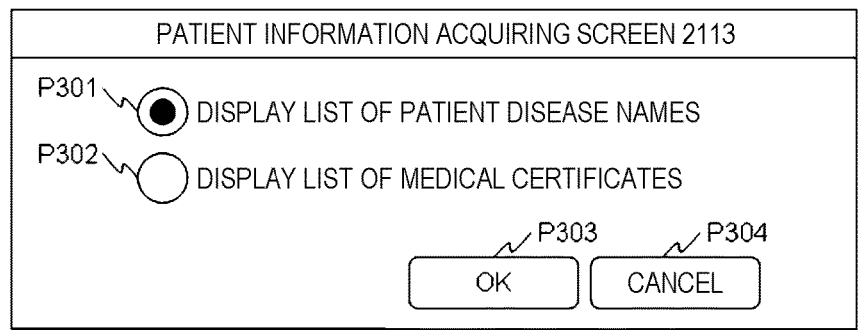
FIG. 12
PATIENT/DISEASE NAME LIST DISPLAYING SCREEN 2114
| PATIENT NUMBER | NAME | DISEASE NAME |
|---|---|---|
| 0000002 | SATO | HYPERTENSION |
| 0000004 | YOSHINO | GASTROENTERITIS |
| ⋮ | ⋮ | ⋮ |
| 1000000 | KOJIMA | DIABETES |
P401
P402
OK
FIG. 13
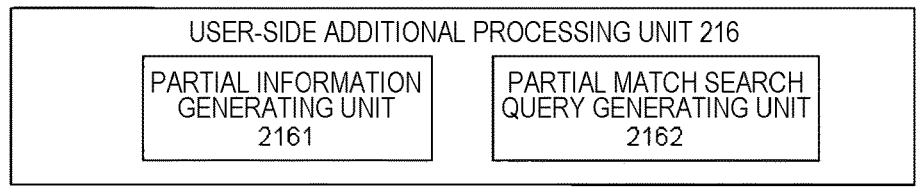
FIG. 14
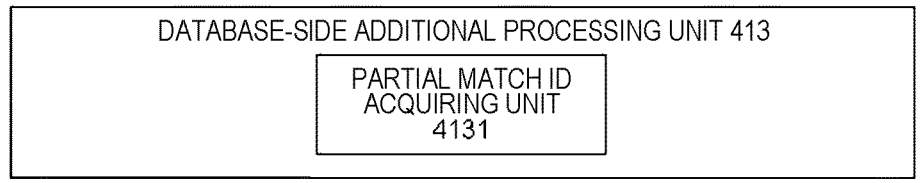

FIG. 15

MEMORY 210

PARTIAL INFORMATION (NAME) 2101

| NAME_PARTIAL INFORMATION | ID | offset |
|---|---|---|
| SUZUKI | 1 | 0 |
| KITA | 1 | 1 |
| TARO | 1 | 2 |
| FUJIWARA | 2 | 0 |
| WARATA | 2 | 1 |
| TARO | 2 | 2 |
| ⋮ | ⋮ | ⋮ |

PARTIAL MATCH SEARCH QUERY INFORMATION 2102

| SEARCH QUERY | offset |
|---|---|
| EncQuery (Fujiwara) | 0 |
| EncQuery (Warata) | 1 |

FIG. 16

ENCRYPTED MAIN INFORMATION GROUP 461

ENCRYPTED PATIENT INFORMATION 4613

| ID | PATIENT NUMBER | NAME |
|---|---|---|
| 1 | Enc(0000001) | Enc(Suzuki Taro) |
| 2 | Enc(0000002) | Enc(Sato Taro) |
| ⋮ | ⋮ | ⋮ |

FIG. 17

DATABASE-SIDE ADDITIONAL INFORMATION GROUP 462

ENCRYPTED PARTIAL INFORMATION (NAME) 4622

| NAME_PARTIAL INFORMATION | ID | offset |
|---|---|---|
| Enc(Suzuki) | 1 | 0 |
| Enc(Kita) | 1 | 1 |
| Enc(Taro) | 1 | 2 |
| Enc(Fujiwara) | 2 | 0 |
| Enc(Warata) | 2 | 1 |
| Enc(Taro) | 2 | 2 |
| ⋮ | ⋮ | ⋮ |

LikeID INFORMATION_xxx 4623

| ID |
|---|
| 2 |

FIG. 18

MEMORY 410

TEMPORARY INFORMATION 4102

| PATIENT NUMBER | NAME |
|---|---|
| Enc(0000003) | Enc(Fujiwara Taro) |

FIG. 28
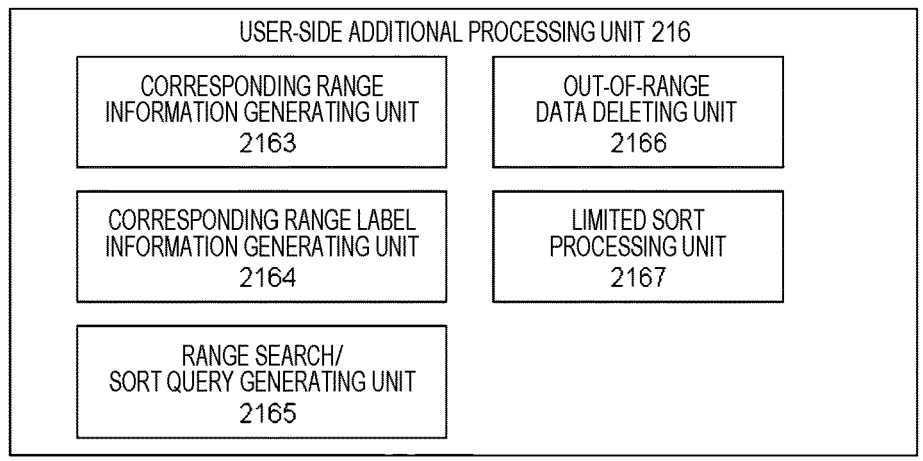
FIG. 29
USER-SIDE ADDITIONAL INFORMATION GROUP 262
CORRESPONDING RANGE INFORMATION (AGE) 2621
| AGE_CORRESPONDING RANGE | RANGE LABEL | FREQUENCY |
|---|---|---|
| 0-9 | 1 | 0 |
| 10-19 | 1 | 1 |
| 20-29 | 1 | 2 |
| 30-39 | 2 | 0 |
| ⋮ | ⋮ | ⋮ |
FIG. 30
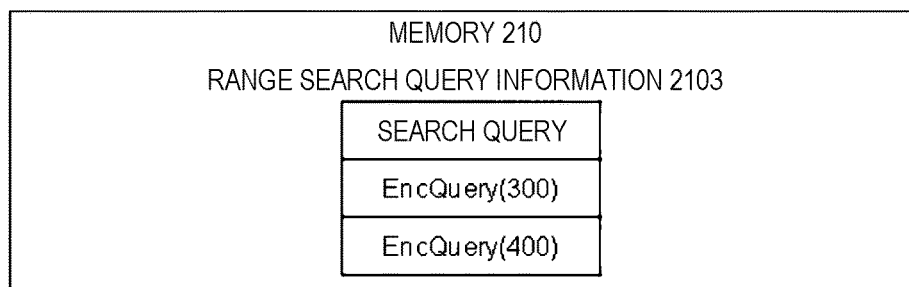

FIG. 31

ENCRYPTED MAIN INFORMATION GROUP 461

ENCRYPTED PATIENT INFORMATION 4614

| ID | PATIENT NUMBER | NAME | AGE |
|---|---|---|---|
| 1 | Enc(0000001) | Enc(Suzuki) | Enc(4) |
| 2 | Enc(0000002) | Enc(Sato) | Enc(9) |
| 3 | Enc(0000003) | Enc(Sato) | Enc(10) |
| 4 | Enc(0000004) | Enc(Kojima) | Enc(15) |
| 5 | Enc(0000005) | Enc(Fujiwara) | Enc(23) |
| 6 | Enc(0000006) | Enc(Yoshino) | Enc(25) |
| 7 | Enc(0000007) | Enc(Sato) | Enc(31) |
| 8 | Enc(0000008) | Enc(Kojima) | Enc(37) |
| ⋮ | ⋮ | ⋮ | ⋮ |

FIG. 32

DATABASE-SIDE ADDITIONAL INFORMATION GROUP 462

ENCRYPTED CORRESPONDING RANGE INFORMATION 4624

| ID | PATIENT NUMBER | NAME | AGE | AGE_RANGE LABEL |
|---|---|---|---|---|
| 1 | Enc(0000001) | Enc(Suzuki) | Enc(4) | Enc(100) |
| 2 | Enc(0000002) | Enc(Sato) | Enc(9) | Enc(100) |
| 3 | Enc(0000003) | Enc(Sato) | Enc(10) | Enc(200) |
| 4 | Enc(0000004) | Enc(Kojima) | Enc(15) | Enc(200) |
| 5 | Enc(0000005) | Enc(Fujiwara) | Enc(23) | Enc(300) |
| 6 | Enc(0000006) | Enc(Yoshino) | Enc(25) | Enc(300) |
| 7 | Enc(0000007) | Enc(Sato) | Enc(31) | Enc(400) |
| 8 | Enc(0000008) | Enc(Kojima) | Enc(37) | Enc(400) |
| ⋮ | ⋮ | ⋮ | ⋮ | ⋮ |

FIG. 33

| MEMORY 410 | | |
|---|---|---|
| TEMPORARY INFORMATION 4103 | | |
| PATIENT NUMBER | NAME | AGE |
| Enc(0000005) | Enc(Fujiwara) | Enc(23) |
| Enc(0000006) | Enc(Yoshino) | Enc(25) |

FIG. 40

```
PATIENT INFORMATION ACQUIRING SCREEN 2121
                              LOWER       UPPER
                        P1101 LIMIT VALUE LIMIT VALUE
· SEARCH CONDITION
  – NARROWING OBJECT  [ AGE ]   [ 22 ]  TO  [ 35 ]
                                  P1102      P1103

P1104
· DISPLAY CONDITION
  – NUMBER OF DISPLAY     [ 2 ]
    ITEMS PER SCREEN
                                   P1106
                         P1105    ● ASCENDING ORDER
  – ORDER OF DISPLAY  [ AGE ] IN
                                  ○ DESCENDING ORDER
                                   P1107
                                       P1108      P1109
                                     [  OK  ]   [ CANCEL ]
```

FIG. 41

| PATIENT INFORMATION DISPLAYING SCREEN 2122 |
|---|

LIST OF PATIENTS (AGE: 22 TO 35)

| PATIENT NUMBER | NAME | AGE |
|---|---|---|
| 0000005 | FUJIWARA | 23 |
| 0000006 | YOSHINO | 25 |

P1201

P1203
[ OK ]

P1202
PAGE: 1  NEXT PAGE: 2

DATABASE SYSTEM AND DATA RETRIEVAL METHOD

TECHNICAL FIELD

The present invention relates to a concealed database system that encrypts data and stores the data in a state where the data is hidden from a system administrator without a key.

BACKGROUND ART

In recent years, with reduced prices and increased scales of storages and development of information technology such as enhancement of networks, the amount of information accumulated is increasing. Under such circumstances, a movement to utilize so-called big data is becoming active.

In addition, since dissemination of cloud computing is advancing, a big data analysis infrastructure on a cloud is expected to be utilized more.

Medical information, personal information, and similar information are extremely sensitive, and it is necessary to cope with risks of information leakage such as restoration of data and transfer of data from the cloud. As one of countermeasures against the above, concealed database systems, which reduce the risk of transfer of data from a cloud by allowing only a user to manage a data encryption key, thereby concealing the data from a system administrator of the cloud not managing the key, and disabling restoration of the data on the cloud, are effective.

It is effective to further use a searchable encryption technology or other technologies that enable a search for encrypted data for the concealed database system described above. This enables retrieval and analysis of data without decrypting the data on the cloud.

As background art of the present technology, PTLs 1, 2, 3, and NPL 1 are disclosed. PTL 1 discloses "a user system connected to a database system via a network, the user system including: a means that manages key information for encryption and decryption; a storage unit that stores security configuration information of data and/or metadata; an application response unit that determines whether encryption is necessary for a database operation command, and in a case where encryption is necessary, selects an encryption algorithm corresponding to data and/or metadata, performs encryption, and transmits a result to a database control unit to cause the database control unit to execute the database operation, in a case where encryption is not necessary, transmits the database operation command to the database control unit to cause the database control unit to execute the database operation, and receives a processing result transmitted by the database control unit, and in a case where decryption or conversion of data and/or metadata of the processing result is necessary, performs necessary decryption or conversion and returns the result as a response to the database operation command; and a security configuration unit that configures security information of data stored in a database."

In addition, PTL 2 discloses a system that enables search, sort, etc. in an encrypted state by encryption storing equivalence relations, holding order relations on a cloud, and similar means.

In addition, NPL 1 discloses a method for speeding up a search by sending a key capable of disclosing partial information of encrypted data to a server side. NPL 1 further discloses a system in which a mechanism of encryption/decryption that operates on a browser of a user as a plug-in in a web application system is provided and searchable encryption is added as a user-defined function of a database for the encryption to be utilized with SQL statements.

CITATION LIST

Patent Literatures

PTL 1: JP 2014-13582 A
PTL 2: JP 2013-25361 A
PTL 3: JP 2012-123614 A

Non-Patent Literature

NPL 1: Nori Matsuda et al., "Efficient Searchable Encryption and Its Application to Web Services," Multimedia, Distributed, Cooperative, and Mobile (DICOMO 2013) Symposium, July 2013

SUMMARY OF INVENTION

Technical Problem

In recent years, user terminals such as smart phones and tablet terminals have been diversified in addition to general PCs. Therefore, a utility form of cloud service is spreading in which various user terminals directly access a cloud, operate a database server via an application server on the cloud, and perform main data processing on the cloud side.

Data acquiring processing in the utility form described above is generally performed by the following flow. First, a user terminal transmits data acquisition conditions including keywords and other information to an application server. Next, the application server on a cloud interprets the data acquisition conditions, generates a database operation command on the basis of a result of the interpretation, transmits the database operation command to a database server, and thereby acquire requested information from the database server. Finally, the application server transmits the acquired information to the user terminal.

In concealed database systems in which only a user manages a key and a database server stores data having been encrypted using the key, there are cases in which a general database operation command generated by an application server cannot be processed.

Specifically, a database server cannot execute the following (1) to (4) data acquisition processing in a concealed database system in which encryption is performed by a probabilistic encryption method in which an equivalence relation and an order relation between ciphertexts are concealed.

(1) A database operation command for combining records included in two different tables and acquiring combined information. For example, in a case where a combination result in which a record including information related to each patient and a record including diagnosis information are combined from a patient table and a diagnosis table, the database operation command described above is issued.

(2) A database operation command for acquiring a record that partially matches a column included in a record of a desired table, with a partial keyword used as a search condition. For example, in a case where a part of the name of a patient is input as a keyword and a record of a partially matching patient is acquired from the patient table, the aforementioned database operation command is issued.

(3) A database operation command for acquiring a record included in a specified range from a desired table, with a range of values of a predetermined column used as a search condition, for example an upper limit value and a lower limit value. For example, in a case where a record of a patient included in a specified range is acquired from the patient table using an upper limit value and a lower limit value of patients' ages as a condition of the range, the database operation command described above is issued.

(4) A database operation command for acquiring a predetermined number of records sorted in a specified order from a predetermined table. For example, in a case where a certain number of records rearranged in an ascending order of patient IDs are acquired from the patient table, the aforementioned database operation command is issued.

The present invention proposes a concealed database system in which the aforementioned database operation command can be executed and a data acquisition method in the concealed database system.

Solution to Problem

A representative example of the invention disclosed herein is as follows. That is, a database system, including: a database server for storing registration information including one or more pieces of encrypted data encrypted using a probabilistic encryption method; and a terminal for transmitting a data acquisition request for acquiring the encrypted data from the database server, in which the probabilistic encryption method is an encryption method in which the encrypted data is generated such that a data value before encryption is different for each encryption processing, the terminal includes: an encryption unit for encrypting data to be stored in the database server in accordance with the probabilistic encryption method using a mask based on a hash value and an output value of a homomorphic function; a decryption unit for decrypting the encrypted data; an encrypted search query generating unit for generating an encrypted search query obtained by encrypting a search query used for retrieving the encrypted data in accordance with the probabilistic encryption method using the mask using the homomorphic function for outputting a same value from a plurality of different input values; and an additional processing unit for encrypting a search condition of a plaintext and transmitting the data acquisition request including the encrypted search condition, the database server holds: database operation command definition information for storing, for each type of search processing, a definition pattern for converting the data acquisition request into a database operation command to be processed by the database server; and search additional information for each type of the search processing, the database server includes: a database operation command generating unit for generating the database operation command by converting the data acquisition request received from the terminal on the basis of the database operation command definition information; a database control unit for acquiring the requested encrypted data by using the database operation command and the search additional information; and an encryption match determining unit for determining the encrypted data that matches the encrypted search query using the search additional information, the additional processing unit generates a data acquisition request for performing search processing using the search additional information, the database control unit calls the encryption match determining unit upon execution of the database operation command, acquires encrypted data satisfying the search condition on the basis of a processing result of the encryption match determining unit, and transmits a processing result including the acquired encrypted data to the terminal, and the decryption unit decrypts the encrypted data included in the processing result.

Advantageous Effects of Invention

According to an aspect of the present invention, a terminal can efficiently acquire encrypted data from a database server without decrypting the encrypted data. Problems, configurations, and effects other than those described above will be made clear from descriptions of the following embodiments.

BRIEF DESCRIPTION OF DRAWINGS

FIG. 2 is a diagram illustrating an example of a data structure of an encrypted main information group of the first embodiment.

FIG. 3 is a diagram illustrating an example of a data structure of a database-side additional information group of the first embodiment.

FIG. 4 is a diagram illustrating an example of a data structure of SQL definition information of the first embodiment.

FIG. 5 is a diagram illustrating an example of a data structure of temporary information temporarily stored in a memory of the first embodiment.

FIG. 11 is a diagram illustrating an example of a patient information acquiring screen of the first embodiment.

FIG. 12 is a diagram illustrating an example of a patient/disease name list displaying screen of the first embodiment.

FIG. 13 is a block diagram illustrating a logical configuration of the user-side additional processing unit of a second embodiment.

FIG. 14 is a block diagram illustrating a logical configuration of a database-side additional processing unit of the second embodiment.

FIG. 15 is a diagram illustrating an example of a data structure of data temporarily stored in a memory of the second embodiment.

FIG. 16 is a diagram illustrating an example of a data structure of an encrypted main information group of the second embodiment.

FIG. 17 is a diagram illustrating an example of a data structure of a database-side additional information group of the second embodiment.

FIG. 18 is a diagram illustrating an example of a data structure of temporary information temporarily stored in a memory of the second embodiment.

FIG. 28 is a block diagram illustrating a logical configuration of a user-side additional processing unit of a third embodiment.

FIG. 29 is a diagram illustrating an example of a data structure of a user-side additional information group of the third embodiment.

FIG. 30 is a diagram illustrating an example of a data structure of data temporarily stored in a memory of the third embodiment.

FIG. 31 is a diagram illustrating an example of a data structure of an encrypted main information group of the third embodiment.

FIG. 32 is a diagram illustrating an example of a data structure of a database-side additional information group of the third embodiment.

FIG. 33 is a diagram illustrating an example of a data structure of temporary information temporarily stored in the memory of the third embodiment.

FIG. 40 is a diagram illustrating an example of a patient information acquiring screen of the third embodiment.

FIG. 41 is a diagram illustrating an example of a patient information displaying screen of the third embodiment.

DESCRIPTION OF EMBODIMENTS

Embodiments of the present invention will be described below with reference to the drawings.

First Embodiment (1-1) Configuration of Computer System of First Embodiment

Figure 1:
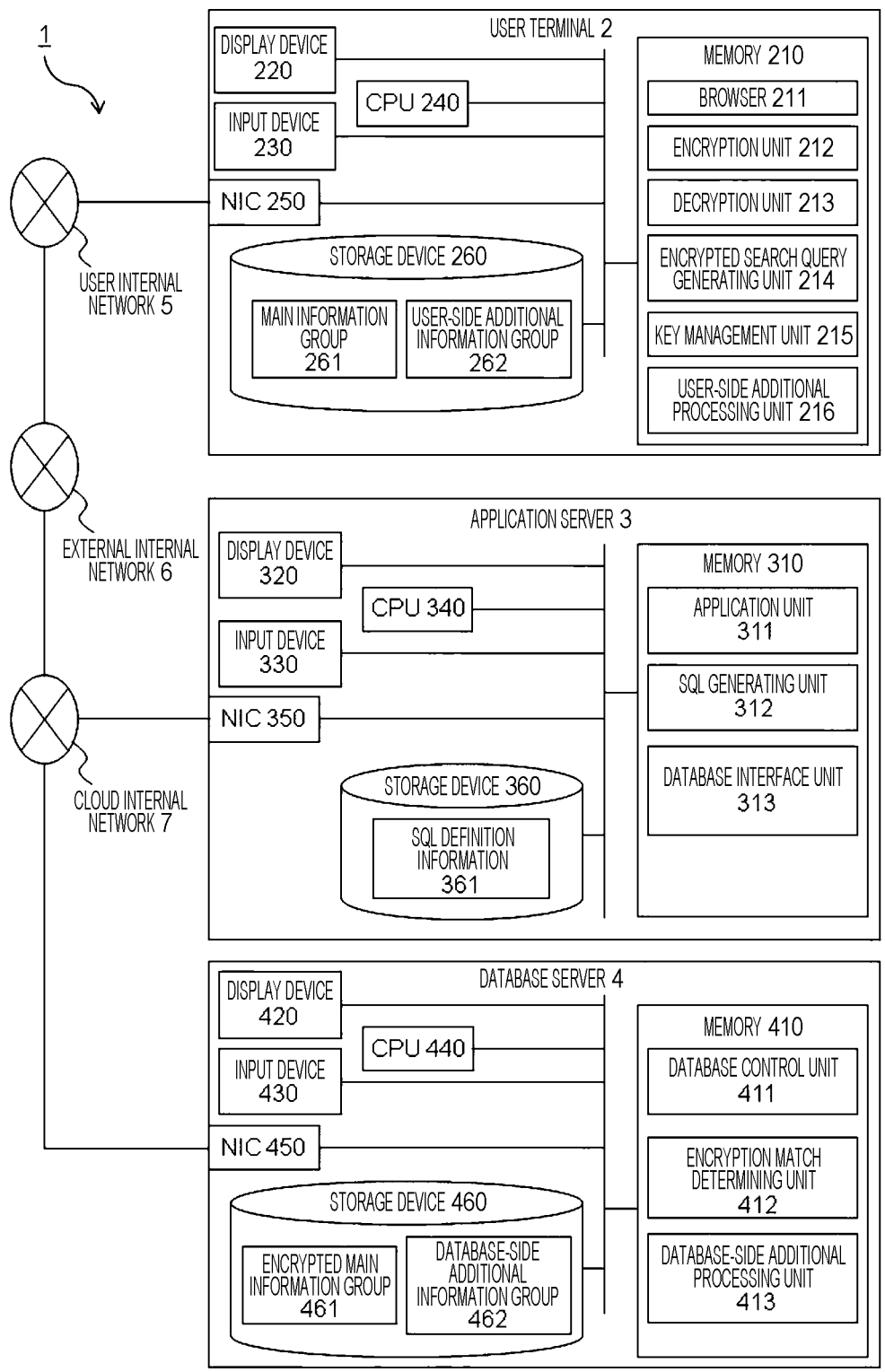
FIG. 1 is a block diagram illustrating a configuration example of a concealed database system of a first embodiment.

FIG. 1 is a block diagram illustrating a configuration example of a concealed database system 1 of a first embodiment.

The concealed database system 1 includes a user terminal 2 that constitutes a user system and an application server 3 and a database server 4 that constitute a data center system. The concealed database system 1 in FIG. 1 includes one user terminal 2, one application server 3, and one database server 4; however, the concealed database system 1 may include two or more sets of each of the above components.

The concealed database system 1 provides the following functions. One is a function of encrypting data managed by a user operating the user terminal 2 and storing encrypted data (ciphertext) in the database server 4 via the application server 3. Another is a search function and an analysis function for encrypted data stored in the database server 4 with the application server 3 and the database server 4 working in cooperation.

The concealed database system 1 of the first embodiment provides a function for implementing the combined information acquiring processing as one of search functions. The combined information acquiring processing is for combining records included in two different tables and acquiring the combined information.

The user terminal 2 and the application server 3 are connected to each other via a user internal network 5, an external network 6, and a cloud internal network 7. In addition, the application server 3 and the database server 4 are connected to each other via the cloud internal network 7.

The user internal network 5 includes a local area network or other networks within a user's office. The external network includes the Internet and a wide area network or other networks provided by a carrier. The cloud internal network 7 includes a local area network or other networks in the data center. Note that the present invention is not limited to the types of network connecting the respective components.

The user terminal 2 is a device such as a personal computer, a tablet terminal, and a smartphone used by a user. The user terminal 2 encrypts a request such as an acquisition request input by the user, transmits the encrypted request to the application server 3, and receives an encrypted processing result for the request. In addition, when receiving the encrypted processing result, the user terminal 2 decrypts the processing result and performs processing such as sorting or shaping of the decrypted processing result. The user terminal 2 further displays the processing result and stores the processing result.

The user terminal 2 includes a memory 210, a display device 220, an input device 230, a CPU 240, a network interface card (NIC) 250, and a storage device 260 as a hardware configuration. Note that the user terminal 2 may include other hardware.

The CPU 240 executes a program stored in the memory 210. With the CPU 240 executing a program, the functions of the user terminal 2 can be implemented. In the following description, when processing is described with a functional unit being a subject, this indicates that the CPU 240 is executing a program that implements the functional unit.

The memory 210 stores a program executed by the CPU 240 and information used for execution of the program. The memory 210 further includes a work area and the like. Details of programs stored in the memory 210 will be described later. Note that a program stored in the memory 210 may be stored in the storage device 260 or an external storage device. In this case, the CPU 240 reads the program from the storage device 260 or the external storage device and develops the read program in the memory 210.

The storage device 260 is a nonvolatile storage device for permanently storing data. The storage device 260 may be a hard disk drive (HDD) and a solid state drive (SSD), for example. Details of data stored in the storage device 260 will be described later.

The display device 220 displays various types of information to the user. The display device 220 may be a display, for example. The input device 230 allows the user to input various types of information to the user terminal 2. The input device 230 may be a keyboard, a mouse, and a touch panel, for example.

Here, programs stored in the memory 210 will be described. The memory 210 stores programs for implementing a browser 211, an encryption unit 212, a decryption unit 213, an encrypted search query generating unit 214, a key management unit 215, and a user-side additional processing unit 216.

The browser 211 displays on the display device 220 a screen for the user to input a request via the input device 230, a screen for referring to a processing result for the request, and other screens.

The encryption unit 212 accepts input of a plaintext and outputs a ciphertext (encrypted data) by encrypting the plaintext on the basis of a probabilistic encryption method described in PTL 3.

Here, the probabilistic encryption method is an encryption algorithm for generating a random ciphertext (encrypted data) in which equivalence relations and magnitude relations are concealed from unencrypted data (plaintext). In the probabilistic encryption method, plaintexts and ciphertexts are in one-to-many correspondence relations.

In the probabilistic encryption method described in PTL 3, data stored in the database server 4 is encrypted according to a probabilistic encryption method using a mask based on a hash value and an output value of a homomorphic function. Moreover, in the probabilistic encryption method described in PTL 3, a query used for retrieving encrypted data is encrypted in accordance with probabilistic encryption with a mask using a homomorphic function that outputs the same value from a plurality of different input values.

More specifically, PTL 3 discloses "a searchable encryption processing system including a DB server for storing registration data encrypted by a probabilistic encryption method and a search client, the searchable encryption processing system performs a search based on a search query, which is received from the search client and is requesting a search of data stored by the DB server, without releasing encryption of the data stored by the DB server, in which the probabilistic encryption method is a data encryption method for generating a ciphertext of different data values from a plaintext of the same data values, the search client includes a storage unit for storing the search query, a control unit for encrypting the search query, and a communication unit for transmitting the search query having been encrypted, the control unit in the search client includes a random number generating unit for generating a first random number, a basic operation unit for encrypting the search query using the first random number by the probabilistic encryption method, and a homomorphic function unit an output value of which is a function value of a homomorphic function using the first random number as an input value, the control unit in the search client includes a compression function unit for converting the function value output by the homomorphic function unit and outputting a hash value, the DB server includes a communication unit for receiving the search query, a storage unit for storing the encrypted search query and the encrypted registered data, and a control unit for determining whether the registered data to be stored corresponds to the search query, the control unit of the DB server includes an overall processing unit for deriving a correlation of random numbers between the encrypted registered data and the encrypted search query and a homomorphic function unit an output value of which is a function value of a homomorphic function using the correlation as an input value, and the encrypted search query transmitted by the search client is data which includes a ciphertext encrypted by the basic operation unit by the probabilistic encryption method and the hash value output by the compression function unit and is encrypted."

By using the probabilistic encryption method described in PTL 3, a search using encrypted data only can be performed on the database server 4 side.

In the following description, in order to distinguish it from encrypted data, data that is not encrypted is also referred to as plaintext data. Moreover, a probabilistic encryption method described herein refers to the probabilistic encryption method described in PTL 3.

The decryption unit 213 accepts input of the ciphertext (encrypted data) and outputs a plaintext (plaintext data) by decrypting the ciphertext in accordance with a procedure opposite to encryption processing of the probabilistic encryption method.

The encrypted search query generating unit 214 accepts input of the plaintext data and outputs an encrypted search query used for encryption match determining processing. Note that the encryption match determining processing is executed by an encryption match determining unit 412. In this specification, an encrypted search query is also simply referred to as a search query.

The key management unit 215 manages key information used for encryption and decryption. When accepting a key acquisition request from the encryption unit 212, the decryption unit 213, and the encrypted search query generating unit 214, the key management unit 215 transmits key information necessary for processing to each of the units.

The user-side additional processing unit 216 executes processing for acquiring encrypted data from the database server 4. Specifically, the following three pieces of processing are executed.

(1) The user-side additional processing unit 216 searches for requested encrypted data from the database server 4 and executes preparatory processing for acquiring the encrypted data.

(2) The user-side additional processing unit 216 converts the acquisition request of data input by the user via the browser 211 into a data acquisition request that can be interpreted by the application server 3, and outputs the acquisition request of the converted data to the application server 3. (3) The user-side additional processing unit 216 accepts, as input, information of the processing result for the data acquisition request received from the application server 3, sorts the data and shapes the data based on the data acquisition request, and then outputs the processing result.

Next, information stored in the storage device 260 will be described. The storage device 260 stores a main information group 261 and a user-side additional information group 262.

The main information group 261 is information managed by the user operating the user terminal 2 and stores plaintext data before being stored in the database server 4. For example, in the main information group 261, a plurality of pieces of information in a table format is stored. Note that the present invention is not limited to the data format of the data stored in the main information group 261.

Since the main information group 261 is usually encrypted and stored in the database server 4, the user terminal 2 does not hold the main information group 261. However, there are cases where the user terminal 2 holds the main information group 261 when data is registered in the database server 4 for the first time.

The user-side additional information group 262 stores additional information to be referred to when a data acquisition request is generated. Processing using the user-side additional information group 262 will be described in a second embodiment.

The application server 3 receives the data acquisition request from the user terminal 2, generates a database operation command for performing processing on encrypted data using the data acquisition request, and transmits the generated database operation command to the database server 4. In addition, the application server 3 receives a processing result for the database operation command from the database server 4 and transmits the processing result to the user terminal 2.

In the present embodiment, SQL will be described as an example of the database operation command. Note that the present embodiment is not limited to the type of the database operation command.

The application server 3 includes a memory 310, a display device 320, an input device 330, a CPU 340, an NIC 350, and a storage device 360 as a hardware configuration. Note that the application server 3 may include other hardware. Since the memory 310, the display device 320, the input device 330, the CPU 340, the NIC 350, and the storage device 360 are the same as the memory 210, the display device 220, the input device 230, the CPU 240, the NIC 250, and the storage device 260, respectively, and thus description thereof is omitted.

Programs stored in the memory 310 will be described. The memory 310 stores programs for implementing an application unit 311, an SQL generating unit 312, and a database interface unit 313.

The application unit 311 processes the data acquisition request received from the user terminal 2, transmits input information included in the data acquisition request to the SQL generating unit 312, and receives a processing result for the data acquisition request from the database server 4.

The SQL generating unit 312 generates SQL including encrypted data corresponding to the input information included in the data acquisition request on the basis of SQL definition information 361 and transmits the SQL to the database interface unit 313. In addition, the SQL generating unit 312 receives a processing result of the SQL from the database interface unit 313 and transmits the processing result to the application unit 311.

The database interface unit 313 transmits the SQL received from the SQL generating unit 312 to the database server 4, receives the processing result of the SQL from the database server 4, and transmits the processing result to the SQL generating unit 312.

Information stored in the storage device 360 will be described. The storage device 360 stores the SQL definition information 361.

The SQL definition information 361 stores information defining SQL generation patterns for each type of data acquisition request.

The SQL definition information 361 is stored in the storage device 360 in the present embodiment; however, the SQL definition information 361 may be stored in the memory 310. Furthermore, the SQL definition information 361 may be stored in both the storage device 360 and the memory 310.

The database server 4 generates a processing result including encrypted data by executing the SQL received from the application server 3 and transmits the processing result to the application server 3.

The database server 4 includes a memory 410, a display device 420, an input device 430, a CPU 440, an NIC 450, and a storage device 460 as a hardware configuration. Note that the database server 4 may include other hardware. Since the memory 410, the display device 420, the input device 430, the CPU 440, the NIC 450, and the storage device 460 are the same as the memory 210, the display device 220, the input device 230, the CPU 240, the NIC 250, and the storage device 260, respectively, and thus description thereof is omitted.

Programs stored in the memory 410 will be described. The memory 410 stores programs for implementing the database control unit 411, the encryption match determining unit 412, and the database-side additional processing unit 413.

The database control unit 411 receives the SQL from the application server 3 and executes the SQL on an encrypted main information group 461 in cooperation with the encryption match determining unit 412 and the database-side additional processing unit 413. In addition, the database control unit 411 transmits a processing result including encrypted data acquired by execution of the SQL to the application server 3.

The encryption match determining unit 412 compares two pieces of encrypted data and determines whether plaintext data before encryption of the encrypted data matches. More specifically, the encryption match determining unit 412 accepts, as input, the encrypted data generated by the encryption unit 212 and the search query generated by the encrypted search query generating unit 214 and determines whether plaintext data of the encrypted data and plaintext data of the search query match with each other. The encryption match determining unit 412 outputs "true" when the two pieces of plaintext data match, and outputs "false" when the two pieces plaintext data do not match.

The encryption match determining unit 412 is capable of determining whether encrypted data is the same data without decrypting the encrypted data.

The database-side additional processing unit 413 has a function in which a user-defined function is created for complex processing which is difficult to be expressed by a simple SQL out of database processing for acquisition of data. More specifically, the database-side additional processing unit 413 accepts the encrypted input information from the database control unit 411, executes additional processing using the database-side additional information group 462 and other information, and outputs a table storing a return value or an output value as a result of the additional processing.

Information stored in the storage device 460 will be described. The storage device 460 stores the encrypted main information group 461 and the database-side additional information group 462.

The encrypted main information group 461 stores encrypted data corresponding to the main information group 261. More specifically, the encrypted main information group 461 stores encrypted data in which plaintext data of the main information group 261 is encrypted on the basis of the probabilistic encryption method. The database-side additional information group 462 stores information for improving the efficiency of data acquiring processing on the encrypted main information group 461.

In the present embodiment, the encrypted main information group 461 is stored in the storage device 460, but may be stored in the memory 410. Furthermore, the encrypted main information group 461 may be stored in both the storage device 460 and the memory 410.

FIG. 2 is a diagram illustrating an example of a data structure of the encrypted main information group 461 of the first embodiment.

The encrypted main information group 461 of the first embodiment includes encrypted patient information 4611 and encrypted diagnosis information 4612.

The encrypted patient information 4611 is a list of patients and includes a plurality of records including an "ID" column, a "patient number" column, and a "name" column. The encrypted patient information 4611 illustrated in FIG. 2 stores one million records of patient number "0000001" to "1000000."

The "ID" column includes identification numbers for uniquely identifying a record of the encrypted patient information 4611. The "patient number" column includes identification numbers for uniquely identifying a patient. The "name" column includes names of patients.

For example, the uppermost record of the encrypted patient information 4611 indicates that the name of a patient whose patient number is "Enc (0000001)" is "Enc (Suzuki) ."

Enc (X) herein indicates that plaintext data X in parentheses is encrypted data encrypted by the encryption unit 212.

The encrypted diagnosis information 4612 is related to diagnosis results of patients and includes a plurality of records including an "ID" column, a "patient number" column, and a "disease name" column. In the encrypted diagnosis information 4612, only records of patients whose disease name is known are stored.

The "ID" column includes identification information for uniquely identifying a record of the encrypted diagnosis information 4612. The "patient number" column is the same as the "patient number" column of the encrypted patient information 4611. The "disease name" column includes disease names indicating a diagnosis result of a patient.

For example, the uppermost record of the encrypted diagnosis information 4612 indicates that a disease name of a patient whose patient number is "Enc (0000002)" is "Enc (Hypertension)."

FIG. 3 is a diagram illustrating an example of a data structure of the database-side additional information group 462 of the first embodiment.

The database-side additional information group 462 of the first embodiment includes encrypted combined information 4621.

The encrypted combined information 4621 includes a plurality of records including an "ID" column, a "patient number" column, a "patient number_query" column, and a "disease name" column. The "ID" column, the "patient number" column, and the "disease name" column correspond to the "ID" column, the "patient number" column, and the "disease name" column of the records included in the encrypted diagnosis information 4612.

The "patient number_query" column includes search queries generated from patient numbers. As described above, the encrypted combined information 4621 includes a column of search queries used for encryption match determining processing executed when combining a plurality of pieces of information (tables) included in the encrypted main information group 461 are combined.

For example, the uppermost record of the encrypted combined information 4621 indicates that the record corresponds to a record of which ID of the encrypted diagnosis information 4612 is "1," that the a search query of patient number of a patient whose patient number is "Enc (0000002)" is "EncQuery (0000002)," and that a disease name of the patient is "Enc (Hypertension)."

Herein, EncQuery (X) indicates that plaintext data X in parentheses is encrypted data encrypted by the encrypted search query generating unit 214.

FIG. 4 is a diagram illustrating an example of the data structure of the SQL definition information 361 of the first embodiment.

The SQL definition information 361 includes a plurality of records storing definition information of SQL generation patterns for each type of data acquisition request. Each of the records includes a definition ID 3611, request processing 3612, and an SQL definition 3613.

A definition ID 3611 is an identification number for uniquely identifying a definition stored in the SQL definition information 361. Request processing 3612 is a processing pattern corresponding to a data acquisition request, that is, a type of data acquisition request. An SQL definition 3613 is SQL definition information corresponding to a processing pattern set in request processing 3612.

For example, the uppermost record of the SQL definition information 361 has an ID of "1" and stores SQL definition information corresponding to a processing pattern corresponding to "combine." In an SQL definition 3613 of the record, SQL for combining encrypted tables X and Y is stored.

Meanwhile, "encryption matching determination (Table_X. Column A, Table_Z. Column B_query)=('true');" in an SQL definition 3613 is a command defining encryption match determining processing for determining whether an "A" column of the table X included in the encrypted main information group 461 and a "search query" column of the table Z that is the encrypted combined information 4621 of a table Y match with each other.

FIG. 5 is a diagram illustrating an example of a data structure of temporary information 4101 temporarily stored in the memory 410 of the first embodiment.

The temporary information 4101 of the first embodiment stores a processing result of the SQL implementing a data acquisition request of which request processing 3612 is "combine." Specifically, the temporary information 4101 is a processing result output by combination of records of the encrypted patient information 4011 and the encrypted diagnosis information 4612 based on the SQL definition 3613 a definition ID 3611 of which is "1." Records stored in the temporary information 4101 include a "patient number" column, a "name" column, and a "disease name" column.

For example, the uppermost record of the temporary information 4101 indicates that a disease name of a patient whose patient number is "Enc (0000002)" with a name of "Enc (Sato)" is "Enc (Hypertension)."

(1-2) Details of Preparatory Processing for Combined Information Acquiring Processing Next, with reference to FIGS. 6, 7, 8, and 9, details of preparatory processing for combined information acquiring processing for performing setting necessary for the combined information acquiring processing will be described.

Figure 6:
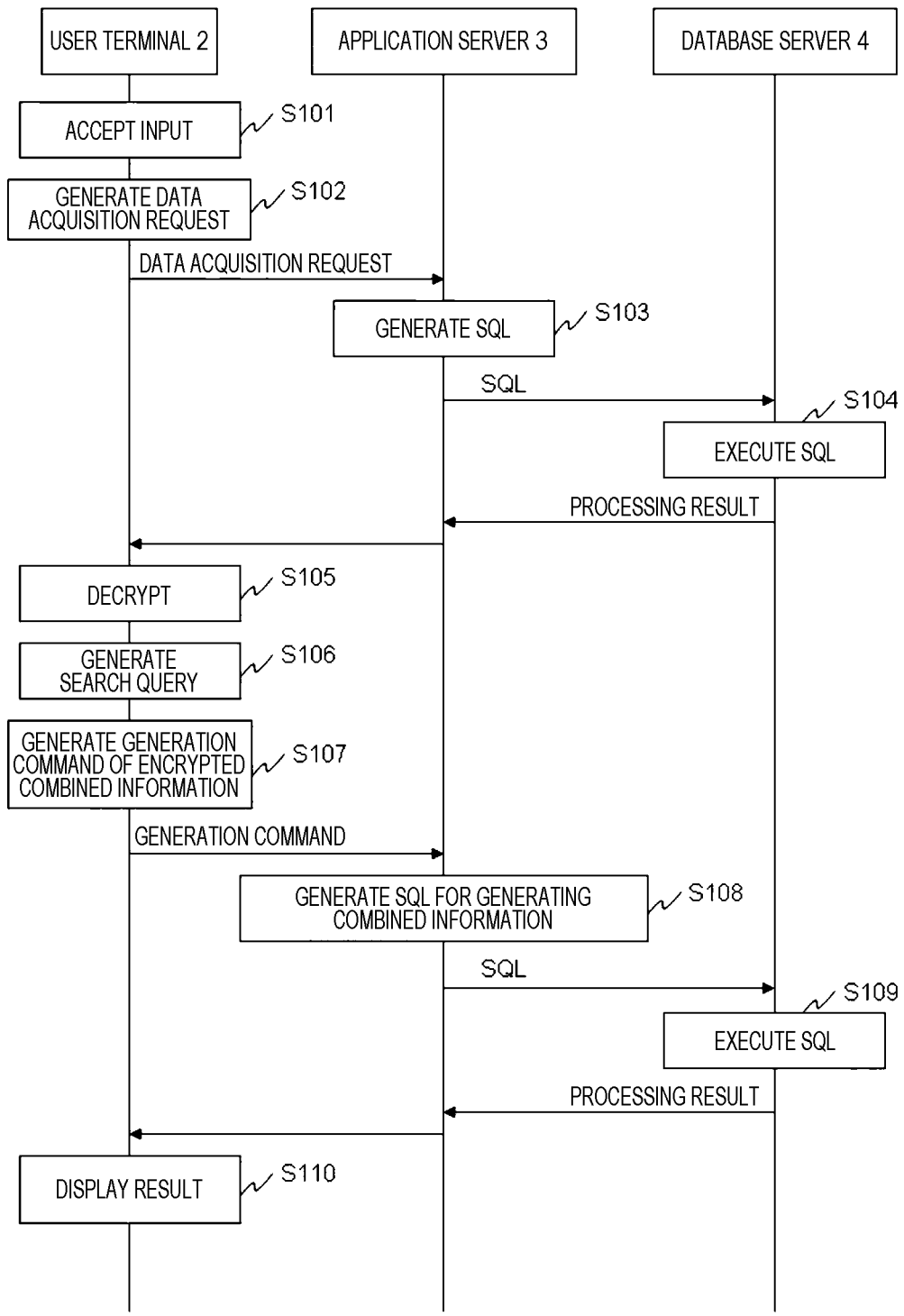
FIG. 6 is a sequence diagram for explaining a flow of preparatory processing for combined information acquiring processing of the first embodiment.
Figure 7:
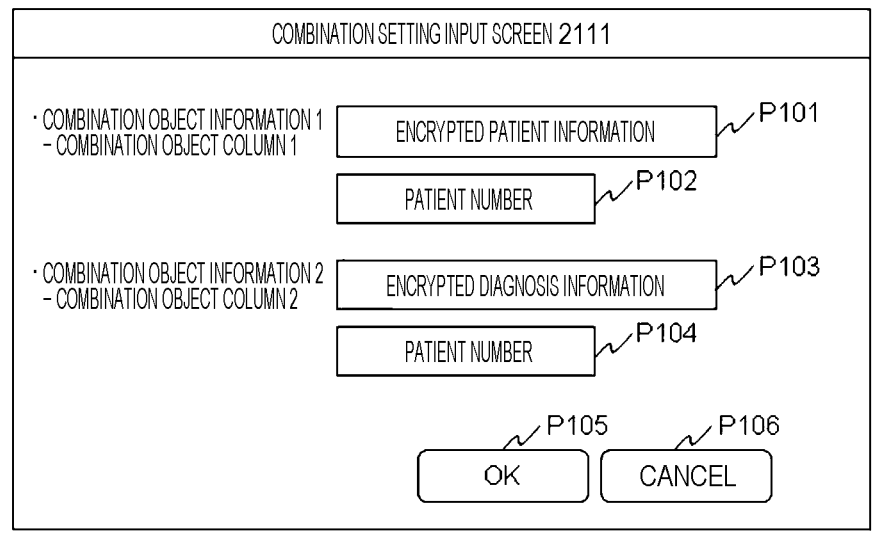
FIG. 7 is a diagram illustrating an example of a combination setting input screen of the first embodiment.
Figure 8:
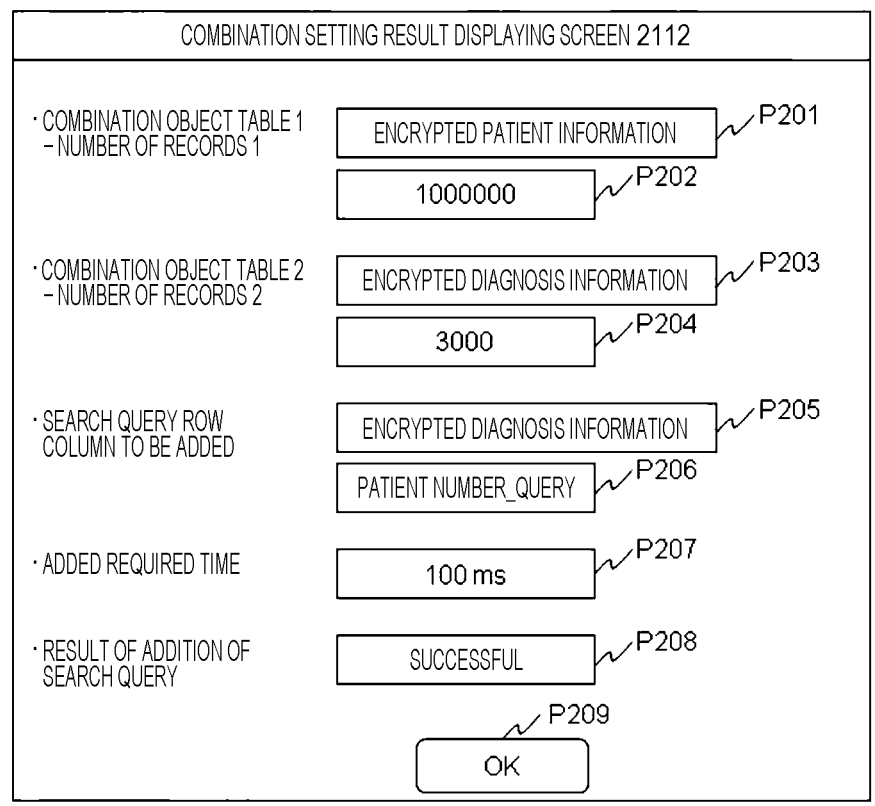
FIG. 8 is a diagram illustrating an example of a combination setting result displaying screen of the first embodiment.

FIG. 6 is a sequence diagram for explaining a flow of preparatory processing for combined information acquiring processing of the first embodiment. FIG. 7 is a diagram illustrating an example of a combination setting input screen 2111 of the first embodiment. FIG. 8 is a diagram illustrating an example of a combination setting result displaying screen 2112 of the first embodiment.

The user terminal 2, the application server 3, and the database server 4 execute the preparatory processing for the combined information acquiring processing in cooperation with each other. The preparatory processing for the combined information acquiring processing is initiated when the user terminal 2 accepts input from the user.

First, the user terminal 2 accepts input from the user (step S101).

For example, the user inputs combination object information and combination object columns using the combination setting input screen 2111 as illustrated in FIG. 7. It is assumed that a system engineer of a cloud service provider that performs registration work of initial information operates the user terminal 2 when configuring a system and that a clerk, a doctor, or other staff of a hospital operates the user terminal 2 when performing registration work of update information.

Here, the combination setting input screen 2111 will be described. The combination setting input screen 2111 is displayed on the display device 220 by the browser 211.

The combination setting input screen 2111 includes a plurality of input forms (P101), (P102), (P103), and (P104) for designating combination object information and combination object columns. The combination setting input screen 2111 further includes an OK button (P105) and a cancel button (P106).

The input forms (P101) and (P102) allow for input of the name of information that is a first combination object and the name of a column. The input forms (P103) and (P104) allow for input of the name of information that is a second combination object and the name of a combination object column.

The OK button (P105) is an operation button for confirming values input to the respective input forms. The cancel button (P106) is an operation button for canceling confirmation of the values input to the respective input forms.

For example, in a case where the user executes preparatory processing for combined information acquiring processing for acquiring records in which the "patient number" column of the encrypted patient information 4611 and the "patient number" column of the encrypted diagnosis information 4612 are combined, the user inputs values as illustrated in FIG. 7. That is, the user enters "encrypted patient information" in the input form (P101), "patient number" in the input form (P102), "encrypted diagnosis information" in the input form (P103), and "patient number" in the input form (P104). When the user presses the OK button (P105), the browser 211 transmits the values of the respective input forms to the user-side additional processing unit 216 as input information.

The above is description of the combination setting input screen 2111. Let us return to the description of FIG. 6.

Next, the user terminal 2 generates a data acquisition request for acquiring values of a combination object column in the combination object information (step S102). Specifically, processing as the following is executed.

First, the user-side additional processing unit 216 executes combination object column determining processing in order to determine combination object information from which values of a combination object column are to be read out.

In the combination object column determining processing, combination object information in which the number of generated search queries is the smallest is determined as the combination object information from which values of a combination object column are to be read out. Details of the combination object column determining processing will be described with reference to FIG. 9.

The user-side additional processing unit 216 generates a data acquisition request including, as input information, the name of the determined combination object information, the name of the combination object column of the information, and a read command and transmits the data acquisition request to the application server 3. The above is description of the processing of step S102.

Next, when receiving the data acquisition request, the application server 3 generates SQL for reading values of the combination object column of the determined combination object information (step S103). Specifically, processing as the following is executed.

The application unit 311 receives the data acquisition request and inputs request information included in the data acquisition request to the SQL generating unit 312.

The SQL generating unit 312 generates SQL for reading the values of the combination object column of the determined combination object information on the basis of the request information and transmits the generated SQL to the application unit 311.

When receiving the SQL as output from the SQL generating unit 312, the application unit 311 transmits the SQL to the database server 4 via the database interface unit 313.

For example in a case where the determined combination object information is the encrypted diagnosis information 4612 and the combination object column is the "patient number" column, the following SQL (A) is generated.

SQL (A)

SELECT patient number FROM encrypted diagnosis information

SQL (A) means to read values of the "patient number" column of all the records included in the encrypted diagnosis information 4612. The above is description of the processing of step S103.

Next, when receiving the SQL from the application server 3, the database server 4 executes the SQL (step S104).

Specifically, the database control unit 411 executes the received SQL and transmits a processing result to the application server 3. The processing result is transmitted to the user terminal 2 via the application server 3.

For example, when receiving the SQL (A), the database server 4 transmits the values of the "patient number" column of all the records of the encrypted diagnosis information 4612 to the user terminal 2 as the processing result. Note that the values of the "patient number" column are encrypted data.

Next, when receiving the processing result from the database server 4, the user terminal 2 decrypts the processing result (step S105). Specifically, processing as the following is executed.

The user-side additional processing unit 216 acquires key information from the key management unit 215 and inputs the acquired key information and the values of the combination object column included in the processing result to the decryption unit 213.

The decryption unit 213 acquires plaintext data by decrypting the values of the combination object column using the key information. The decryption unit 213 transmits the plaintext data to the user-side additional processing unit 216.

For example, in a case where a value of the combination object column is "Enc (0000002)," the decryption unit 213 acquires "0000002" as plaintext data. The above is description of the processing of step S105.

Next, the user terminal 2 generates a search query using the plaintext data and the key acquired in step S105 (step S106). Specifically, processing as the following is executed.

The user-side additional processing unit 216 acquires the key information from the key management unit 215 and inputs the acquired key information and the plaintext data received from the decryption unit 213 to the encrypted search query generating unit 214.

When accepting the input from the user-side additional processing unit 216, the encrypted search query generating unit 214 generates a search query of the value of the combination object column. The encrypted search query generating unit 214 transmits the generated search query to the user-side additional processing unit 216.

For example, in a case where "0000002" is input as plaintext data, the encrypted search query generating unit 214 generates encrypted data of "EncQuery (0000002)" as the search query using the input key information. The above is description of the processing of step S106.

Next, the user terminal 2 generates a generation command for generating the encrypted combined information 4621 (step S107). Specifically, processing as the following is executed.

After receiving the search query from the encrypted search query generating unit 214, the user-side additional processing unit 216 inserts a column of the search query into the combination object information determined in step S102, and generates a generation command for generating the encrypted combined information 4621 in the database-side additional information group 462. Specifically, the user-side additional processing unit 216 generates a generation command including the name of information to be used, the name of the column to be inserted, and all search queries set to the column.

For example, a generation command is generated which uses information of "encrypted diagnosis information 4612," has "patient number_query" as the name of a new column, and sets a search query "EncQuery (X)" to the new column.

The user-side additional processing unit 216 transmits the generated generation command to the application server 3. The above is description of the processing of step S107.

Next, the application server 3 generates SQL for generating the encrypted combined information 4621 (step S108). Specifically, processing as the following is executed.

When receiving the generation command including the name of information to be used, the name of the column to be inserted, and all the search queries set to the column, the application unit 311 inputs each pieces of information included in the generation command to the SQL generating unit 312.

The SQL generating unit 312 generates SQL for generating the encrypted combined information 4621 on the basis of the name of the information to be used, the name of the column to be inserted, and all the search queries set to the column. In addition, the SQL generating unit 312 transmits the generated SQL to the application unit 311.

When receiving the SQL, the application unit 311 transmits the SQL to the database server 4 via the database interface unit 313.

For example, in a case where the information to be used is "encrypted diagnosis information 4612," the name of the new column is "patient number_query," and the search query "EncQuery (X)," the following SQL (B) and SQL (C) are generated.

SQL (B)
ALTER TABLE Encrypted Diagnosis Information ADD Patient Number_Query BLOB;
SQL (C)
INSERT INTO Encrypted Diagnosis Information (Patient Number_Query)
VALUES (EncQuery (0000002),
EncQuery (0000004),
. . .
EncQuery (1000000));

SQL (B) means adding a "patient number_query" column to the encrypted diagnosis information 4612. SQL (C) means setting a search query in the "patient number_query" column of each record. The above is description of the processing of step S108.

Next, when receiving the SQL from the application server 3, the database server 4 executes the SQL (step S109). Specifically, processing as the following is executed.

The database control unit 411 generates the encrypted combined information 4621 by executing the received SQL. The database control unit 411 assigns identification information to the encrypted combined information 4621. This is because a plurality of pieces of encrypted combined information 4621 is generated based on combinations of combination object information.

The database control unit 411 transmits a processing result including information related to the encrypted combined information 4621 to the application server 3. The processing result is transmitted to the user terminal 2 via the application server 3.

For example, when the database server 4 receives SQL (B) and SQL (C), the database control unit 411 copies the encrypted diagnosis information 4612 to the database-side additional information group 462, adds a "patient number_query" column to the encrypted diagnosis information 4612, sets values to the column, and thereby generates the encrypted combined information 4621. The database server 4 transmits, to the application server 3, a processing result including a result status indicating that the generation of the encrypted combined information 4621 has been successful, the number of values set in the "patient number_query" column, required time required for generation of the encrypted combined information 4621, etc.

At this time, the application unit 311 of the application server 3 generates result displaying information on the basis of the received processing result and the information received in steps S102 and S107, and transmits the result displaying information to the user terminal 2. The above is description of the processing of step S109.

Next, the user terminal 2 displays a result of the series of processing to the user (step S110).

Specifically, when receiving the result displaying information, the browser 211 of the user terminal 2 displays a combination setting result displaying screen 2112 as illustrated in FIG. 8 on the display device 220 on the basis of the result displaying information.

Here, the combination setting result displaying screen 2112 will be described. The combination setting result displaying screen 2112 is displayed on the display device 220 by the browser 211.

The combination setting result displaying screen 2112 includes a plurality of display forms (P201), (P202), (P203), (P204), (P205), (P206), (P207), and (P208) for indicating the values input using the combination setting input screen 2111 and the execution result of the SQL. The combination setting result displaying screen 2112 further includes an OK button (P209).

The display forms (P201) and (P203) display the name of information that is the first combination object and the name of information that is the second combination object, respectively, having been input using the combination setting input screen 2111. The display forms (P202) and (P204) display the number of records of the first combination object information and the number of records of the second combination object information, respectively.

The display form (P205) displays the name of information into which the column of the search query is inserted. The display form (P206) displays the name of the column of the search query to be inserted.

The display form (P207) displays time required for generation of the encrypted combined information 4621. The display form (P208) displays a generation result of the encrypted combined information 4621. Either "successful" or "failed" is displayed in the display form (P208).

The OK button (P209) is an operation button for instructing termination of the display.

For example in a case where values as illustrated in FIG. 7 are input, "encrypted patient information" is displayed in the display form (P201), "1000000" is displayed in the display form (P202), "encrypted diagnosis information" is displayed in the display form (P203), and "3000" is displayed in the display form (P204). Moreover, when the encrypted combined information 4621 is generated on the basis of the SQL (B) and the SQL (C), "encrypted diagnosis information" is displayed in the display form (P205), and "patient number_query" is displayed in the display form (P206). In addition, "100 ms" is displayed in the display form (P207), and "successful" is displayed in the display form (P208). When the user presses the OK button (P209), the display of the combination setting result displaying screen 2112 is terminated.

The above is description of the combination setting result displaying screen 2112. Let us return to the description of FIG. 6.

The user terminal 2 may store the processing result in the user-side additional information group 262 as required, or may transmit the processing result to the application server 3 or the database server 4. Note that the processing result includes a correspondence relation between the encrypted combined information 4621 and information used for generation of the encrypted combined information 4621, a correspondence relation between the search query and the column of the information used for the generation of the encrypted combined information 4621, etc.

Note that in a case where the user terminal 2 holds the main information group 261, the processing from step S102 to step S105 can be omitted. The above is description of the flow of the combination preparation processing.

Figure 9:
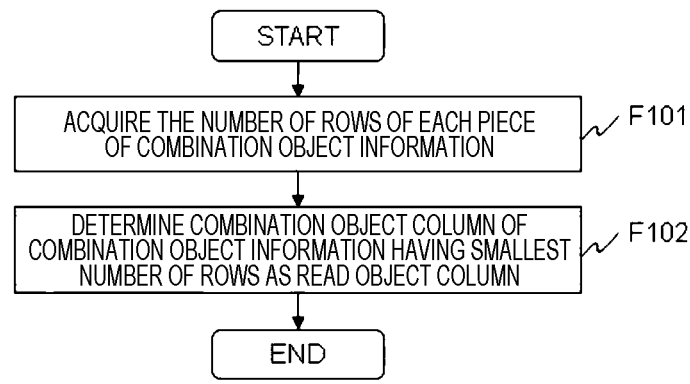
FIG. 9 is a flowchart for explaining an example of combination object column determining processing executed by a user-side additional processing unit of the first embodiment.

FIG. 9 is a flowchart for explaining an example of combination object column determining processing executed by the user-side additional processing unit 216 of the first embodiment.

When receiving names of combination object information, the user-side additional processing unit 216 initiates the combination object column determining processing described below.

First, the user-side additional processing unit 216 acquires the number of records of first combination object information and second combination object information (step F101).

Specifically, the user-side additional processing unit 216 reads information related to the number of records of each of the pieces of combination object information from the user-side additional information group 262.

Note that, in a case where there is no information related to the number of records of combination object information in the user-side additional information group 262, the user-side additional processing unit 216 transmits an acquisition request of the number of records of each of the pieces of combination object information to the application server 3. As a result, SQL is transmitted to the database server 4 in order to count the number of records of each of the pieces of combination object information. The user-side additional processing unit 216 can acquire the number of records of each of the pieces of combination object information by receiving a processing result of the SQL from the database server 4.

Next, the user-side additional processing unit 216 determines combination object information having a small number of records as combination object information from which values of a combination object column are to be read out (step F102).

In the case where the encrypted patient information 4611 and the encrypted diagnosis information 4612 are pieces of combination object information, the number of records of the encrypted diagnosis information 4612 is smaller than the number of records of the encrypted patient information 4611. Therefore, the user-side additional processing unit 216 determines the encrypted diagnosis information 4612 as the combination object information from which values of a combination object column are to be read out. The combination object column is the "patient number" column.

By execution the combination object column determining processing, it is possible to minimize the number of search queries generated and added. Therefore, it is possible to shorten processing time of the combination preparation processing and the combined information acquiring processing described with reference to FIG. 10.

The above is description of the preparatory processing for the combined information acquiring processing.

(1-3) Details of Combined Information Acquiring Processing

Next, with reference to FIGS. 10, 11, and 12, details of the combined information acquiring processing will be described.

Figure 10:
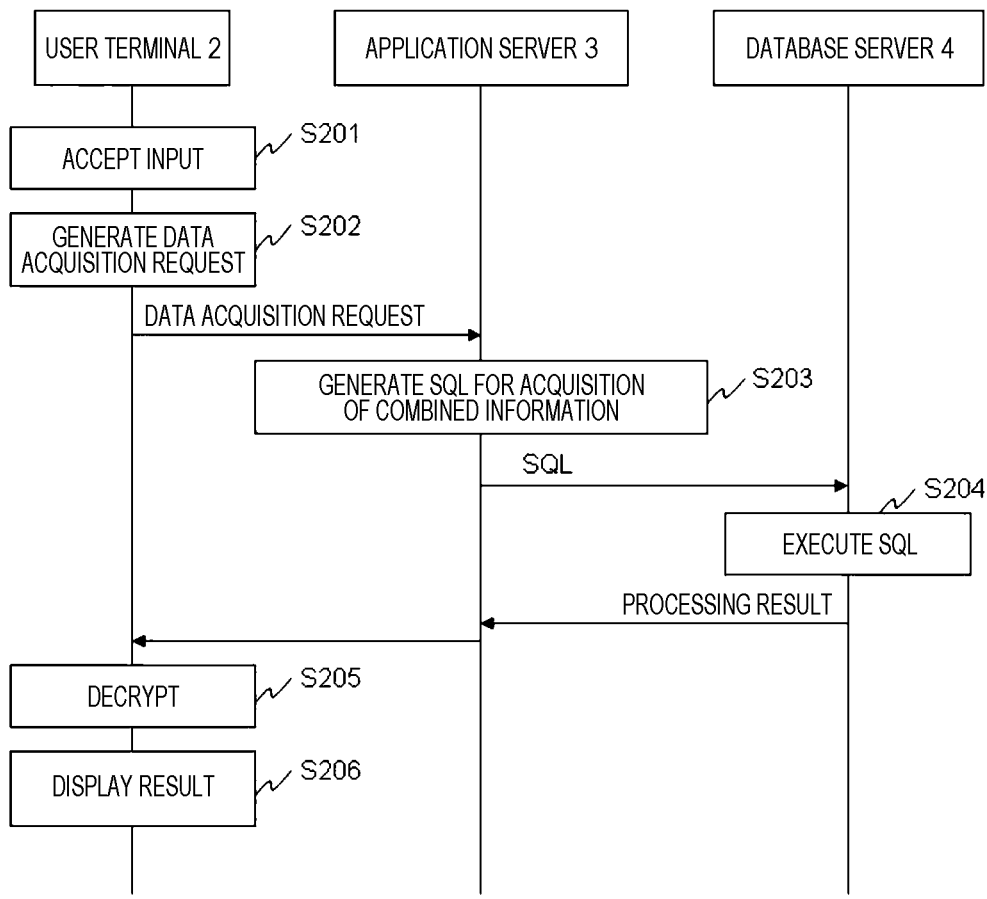
FIG. 10 is a sequence diagram illustrating a flow of combined information acquiring processing of the first embodiment.

FIG. 10 is a sequence diagram illustrating a flow of the combined information acquiring processing of the first embodiment. FIG. 11 is a diagram illustrating an example of patient information acquiring screen 2113 of the first embodiment. FIG. 12 is a diagram illustrating an example of the patient/disease name list displaying screen 2114 of the first embodiment.

The user terminal 2, the application server 3, and the database server 4 execute the combined information acquiring processing in cooperation with each other. The combined information acquiring processing is initiated when the user terminal 2 accepts input from the user.

First, the user terminal 2 accepts input from the user (step S201).

For example, the user inputs information necessary for acquisition of combined information using the patient information acquiring screen 2113 as illustrated in FIG. 11. It is assumed that a doctor who has saved sensitive information operates the user terminal 2 to display master information indicating basic information of a patient and data obtained by matching the latest diagnosis result of the patient.

Here, the patient information acquiring screen 2113 will be described. The patient information acquiring screen 2113 is displayed on the display device 220 by the browser 211.

The patient information acquiring screen 2113 includes a plurality of radio buttons (P301) and (P302) for selecting information to be acquired. The patient information acquiring screen 2113 further includes an OK button (P303) and a cancel button (P304).

The radio button (P301) is for displaying a list of disease names of respective patients. The radio button (P302) is for displaying a list of medical certificates.

The OK button (P303) is an operation button for confirming input of a selected radio button. The cancel button (P304) is an operation button for canceling confirmation of input of a selected radio button.

For example, the user selects the radio button (P301) and presses the OK button (P105).

The above is description of the patient information acquiring screen 2113. Let us return to the description of FIG. 10.

Next, the user terminal 2 generates a data acquisition request for acquiring the combined information (step S202). Specifically, processing as the following is executed.

The user-side additional processing unit 216 specifies a type of operation necessary for acquisition of requested information. The user-side additional processing unit 216 specifies a column required for the requested information and specifies information including the specified column. The user-side additional processing unit 216 further specifies the encrypted combined information 4621 for storing a search query used for the encryption match determining processing.

For example, it is conceivable that the type of operation, necessary columns, and encrypted combined information 4621 are associated with the operation screen in advance. It is also conceivable to that definition information indicating a data structure of information included in the main information group 261 is stored in advance in the user-side additional information group 262.

The user-side additional processing unit 216 generates an acquisition request of data including the type of operation, the name of object information, the name of an object column, the identification information of the encrypted combined information 4621, and the read command. The user-side additional processing unit 216 transmits the generated data acquisition request to the application server 3.

For example, when the radio button (P301) is selected, the patient number, the name, and the disease name are specified as columns required for the requested information, and the encrypted patient information 4611 and the encrypted diagnosis information 4612 are specified as being necessary for the requested information. Also, the encrypted combined information 4621 including the patient number_query is specified as the encrypted combined information 4621 for storing the search query used for the encryption match determining processing.

Note that the application server 3 may specify the encrypted combined information 4621 for storing the type of operation required for acquisition of the requested information and the search query. In this case, the application server 3 or the database server 4 hold information necessary for specifying. The above is description of the processing of step S202.

Next, the application server 3 generates SQL for acquiring combined information in which two pieces of information are combined (step S203). Specifically, processing as the following is executed.

When receiving the data acquisition request, the application unit 311 transmits the data acquisition request to the SQL generating unit 312.

The SQL generating unit 312 refers to the SQL definition information 361 and specifies a record, request processing 3612 of which matches the type of processing included in the data acquisition request. In this case, a record a definition ID 3611 of which is "1" is specified.

The SQL generating unit 312 generates SQL on the basis of the name of the column, the name of the information, the identification information of the encrypted combined information 4621 including the search query included in the data acquisition request, as well as the SQL definition 3613 of the specified record. The SQL generating unit 312 transmits the generated SQL to the application unit 311.

The application unit 311 transmits the SQL to the database server 4 via the database interface unit 313.

For example, in a case where the radio button (P301) is selected, the SQL generating unit 312 generates SQL (D) as follows.

SQL (D)

SELECT Patient Number, Name, Disease Name FROM Encrypted Patient Information X
JOIN Encrypted Combined Information Y
ON (
Encryption Match Determination (X. Patient Number, Y. Patient Number_Query)='true');

SQL (D) means to combine matching records of each piece of information in a case where a value of the "patient number" column of the encrypted patient information 4611 matches a value of the "patient number_query" column of the encrypted combined information 4621 and to read out values of the "patient number" column, the "name" column, and the "disease name" column from the combination result. The above is description of the processing of step S203.

Next, when receiving the SQL from the application server 3, the database server 4 executes the SQL (step S204).

Specifically, the database control unit 411 executes the received SQL and transmits a processing result to the application server 3. The processing result is transmitted to the user terminal 2 via the application server 3.

For example, when receiving the SQL (D), the database control unit 411 calls the encryption match determining unit 412. The encryption match determining unit 412 determines whether a value of the "patient number" column of one record included in the encrypted patient information 4611 matches a value of the "patient number_query" column of one record included in the encrypted combined information 4621. On the basis of a determination result of the encryption match determining unit 412, the database control unit 411 acquires a record a value of the "patient number_query"

column of which matches a value of the "patient number" column and stores the record in the temporary information 4101.

When the SQL (D) is executed, the temporary information 4101 as illustrated in FIG. 5 is output on the memory 410. The database control unit 411 transmits a processing result including the temporary information 4101 to the application server 3.

Note that whether a value of a column of encrypted information matches a value of a search query can be determined by using the probabilistic encryption method of PTL 3. Since a specific determination method is described in PTL 3, detailed description thereof will be omitted.

Next, when receiving the processing result, the user terminal 2 decrypts the processing result (step S205).

Specifically, when receiving the processing result including the temporary information 4101, the user-side additional processing unit 216 acquires key information from the key management unit 215 and transmits the temporary information 4104 and the key information to the decryption unit 213. The decryption unit 213 acquires plaintext data by decrypting the temporary information 4104 using the key information. The decryption unit 213 transmits the plaintext data to the user-side additional processing unit 216. The user-side additional processing unit 216 transmits the plaintext data to the browser 211.

Next, the user terminal 2 displays a result of the series of processing to the user (step S206).

Specifically, the browser 211 generates display information for displaying the processing result including the plaintext data and displays the patient/disease name list displaying screen 2114 as illustrated in FIG. 12 on the display device 220 on the basis of the display information.

Here, the patient/disease name list displaying screen 2114 will be described. The patient/disease name list displaying screen 2114 is displayed on the display device 220 by the browser 211.

The patient/disease name list displaying screen 2114 includes a combination result (P401) which is plaintext data. The patient/disease name list displaying screen 2114 further includes an OK button (P402).

The combination result illustrated in FIG. 12 includes a plurality of records including a "patient number" column, a "name" column, and a "disease name" column. The uppermost record indicates that a patient whose patient number is "0000002" with the name of "Sato" has received a diagnosis result of hypertension. The OK button (P402) is an operation button for instructing termination of the display.

The above is description of the patient/disease name list displaying screen 2114. In addition, the above is description of the combined information acquiring processing.

Note that the encrypted combined information 4621 is generated using one of the two pieces of combination object information in the first embodiment; however, the present invention is not limited thereto. In a case where first information and second information are combined, the encrypted combined information 4621 may include a plurality of records in which the name of the first information, the name of a combination object column of the first information, the name of the second information, the name of a combination object column of the second information, and a search query are associated with each other.

In the case of the encrypted combined information 4621 described above, the database control unit 411 executes the encryption match determining processing on each of the first information and the second information and combines a record of the first information matching the search query and a record of the second information matching the search query.

(1-4) Effect of First Embodiment

As described above, in the concealed database system 1 of the first embodiment, combined information in which two pieces of encrypted information are combined is transmitted to the user terminal 2 on the basis of the encrypted combined information 4621 and the SQL definition information 361 without decrypting the encrypted information in the database server 4. Therefore, it is possible to implement a concealed database system capable of executing a database operation command for acquiring a combination result while confidentiality of data is maintained.

Second Embodiment

A concealed database system 1 of a second embodiment is different from the first embodiment in that a function for implementing partial match search processing is provided. The partial match search processing is for acquiring a record that partially matches a column included in a record of a desired table using a partial keyword as a search condition. Hereinafter, the second embodiment will be described with a focus on differences from the first embodiment.

(2-1) Configuration of Computer System of Second Embodiment

The concealed database system 1 of the second embodiment has the same configuration as that of the first embodiment, and thus description thereof is omitted. In addition, hardware configurations of a user terminal 2, an application server 3, and a database server 4 of the second embodiment are the same as those of the first embodiment, and thus description thereof is omitted.

In the second embodiment, a software configuration and the contents of the information held by each device are partially different.

First, a software configuration of the user terminal 2 will be described. The software configuration of the user terminal 2 of the second embodiment is the same as that of the user terminal 2 of the first embodiment. However, it is different from the first embodiment that a user-side additional processing unit 216 of the second embodiment has a function for implementing partial match search processing.

FIG. 13 is a block diagram illustrating a logical configuration of the user-side additional processing unit 216 of the second embodiment.

The user-side additional processing unit 216 includes a partial information generating unit 2161 and a partial match search query generating unit 2162 as a function for implementing partial match search processing.

The partial information generating unit 2161 accepts input of plaintext data of a column of desired information, generates partial information 2101 by dividing the plaintext data into a predetermined granularity, and outputs the partial information 2101. Note that the division granularity of plaintext data is determined in preparatory processing for partial match search processing which will be described later.

The partial match search query generating unit 2162 accepts input of a search term which is plaintext data, divides the search term into a predetermined granularity, generates a partial match search query (encrypted search query) obtained by encrypting the divided search term in cooperation with an encrypted search query generating unit 214, and outputs the partial match search query. Note that the division granularity of a search term is determined in partial match search processing which will be described later.

Next, a software configuration of the application server 3 will be described. The software configuration of the application server 3 of the second embodiment is the same as the software configuration of the application server 3 of the first embodiment.

In the second embodiment, the application server 3 generates SQL for implementing partial match search processing on the basis of an SQL definition 3613 a definition ID 3611 of which is "2." Here, the SQL definition 3613 a definition ID 3611 of which is "2" includes SQL (E) and SQL (F) as follows.

SQL (E)
SELECT Partial Match ID Acquisition (Name_Partial Information,
  Like ID Information_xxx, Partial Match Search Query);
SQL (F)
SELECT Patient Number, Name FROM Encrypted Patient Information
  JOIN Like ID Information_xxx
  ON (Encrypted Patient Information.ID=Like ID Information_xxx.ID);

SQL (E) is SQL for instructing a partial match ID acquiring unit 4131 to execute partial match ID acquiring processing and means to extract an ID that matches partial match search query information 2102 from encrypted partial information 4622 and to output the ID to Like ID Information_xxx 4623. SQL (F) means to combine the encrypted patient information 4613 and the Like ID Information_xxx 4623 by the "ID" column and to read values of the "patient number" column and the "name" column of the matching records.

Next, a software configuration of the database server 4 will be described. The software configuration of the database server 4 of the second embodiment is the same as the software configuration of the database server 4 of the first embodiment. However, it is different from the first embodiment that a database-side additional processing unit 413 of the second embodiment has a function for implementing the partial match search processing.

FIG. 14 is a block diagram illustrating a logical configuration of the database-side additional processing unit 413 of the second embodiment.

The database-side additional processing unit 413 includes a partial match ID acquiring unit 4131 as a function for implementing the partial match search processing.

The partial match ID acquiring unit 4131 accepts as input the name of an output table for storing a partial match search query and an ID of a record that partially matches, determines an ID that partially matches using the encryption match determining unit 412, and outputs the ID to the output table.

Next, information contained in each of the components of the second embodiment will be described.

FIG. 15 is a diagram illustrating an example of a data structure of data temporarily stored in a memory 210 of the second embodiment.

The memory 210 of the second embodiment stores the partial information 2101 and the partial match search query information 2102.

The partial information 2101 includes a plurality of records including a "Name_Partial Information" column, an "ID" column, and an "offset" column.

The "Name_Partial Information" column includes values obtained by dividing values of a column subjected to the partial match search processing. In this embodiment, since the partial match search processing is performed on the "name" column of the encrypted patient information 4613, the partial information 2101 includes the "Name_Partial Information" column. Note that when objects of the partial match search processing are different, the partial information 2101 includes a "(name of an object column)_partial information" column.

The "ID" column includes an identification number of a record storing a value before a value stored in the "Name_Partial Information" column has been divided. The "ID" column of this embodiment corresponds to the "ID" column of the encrypted patient information 4613.

The "offset" column includes a division position of a value stored in the "Name_Partial Information" in a value before division.

For example, the uppermost entry of the partial information 2101 indicates that "Suzuki" stored in the "Name_Partial Information" column is a value obtained by dividing a value of "Suzuki Taro" of the "name" column of a record having "1" in the "ID" column in the encrypted patient information 4613 and that the division position is "0."

The partial match search query information 2102 includes a plurality of records each storing a partial match search query generated from values obtained by dividing a search terms used for the partial match search processing. Each of the records includes a "search query" column and an "offset" column.

The "search query" column includes a partial match search query. The "offset" column includes a division position of a value in the search term before encryption.

The partial match search query information 2102 in FIG. 15 indicates that search queries generated from a search term "Fujiwara Ta" are stored. The uppermost record of the partial match search query information 2102 indicates that a search query is "EncQuery (Fujiwara)" and that a division position of "Fujiwara" before encryption in the search term is "0."

FIG. 16 is a diagram illustrating an example of a data structure of an encrypted main information group 461 of the second embodiment.

The encrypted main information group 461 of the second embodiment includes encrypted patient information 4613.

The encrypted patient information 4613 is a list of patients and includes a plurality of records including an "ID" column, a "patient number" column, and a "name" column.

The "ID" column, the "patient number" column, and the "name" column are the same as the "ID" column, the "patient number" column, and the "name" column of the encrypted patient information 4611 of the first embodiment, respectively.

For example, the uppermost record of the encrypted patient information 4613 indicates that a record having an ID of "1" has a patient number of "Enc (0000001)" and the name of "Enc (Suzuki Taro)."

FIG. 17 is a diagram illustrating an example of a data structure of a database-side additional information group 462 of the second embodiment.

The database-side additional information group 462 of the second embodiment includes the encrypted partial information 4622 and the Like ID Information_xxx 4623 used for the partial match search processing.

The encrypted partial information 4622 includes a plurality of records including a "Name_Partial Information" column, an "ID" column, and an "offset" column.

The "Name_Partial Information" column includes encrypted data to be compared with a partial match search query in the encryption match determining processing. For example in the "Name_Partial Information" column of the uppermost record of the encrypted partial information 4622, "Enc (Suzuki)" obtained by encrypting "Suzuki" is stored.

The "ID" column and the "offset" correspond to the "ID" column and the "offset" of the partial information 2101.

The Like ID Information_xxx 4623 includes an ID output by the partial match ID acquiring unit 4131. Like ID Information_xxx 4623 includes only an "ID" column. Different values are set to "xxx" in the Like ID Information_xxx 4623 for each partial match search processing.

The Like ID Information_xxx 4623 illustrated in FIG. 17 indicates that an ID output from the partial match ID acquiring unit 4131 is "2" only.

FIG. 18 is a diagram illustrating an example of a data structure of temporary information 4102 temporarily stored in a memory 410 of the second embodiment.

The temporary information 4102 stores an execution result of SQL (F). Specifically, the temporary information 4102 stores, from the encrypted patient information 4613, values of the "patient number" column and the "name" column of a record including an ID that has matched the partial match search query in the partial match search processing. Therefore, the temporary information 4102 includes one record including the "patient number" column and the "name" column.

The temporary information 4102 in FIG. 18 indicates that a record having a patient number of "Enc (0000003)" and the name of "Enc (Fujiwara Taro)" is output as a result of the partial match search processing.

(2-2) Details of Preparatory Processing for Partial Match Search Processing

Next, with reference to FIGS. 19, 20, 21, and 22, details of preparatory processing for partial match search processing for performing setting necessary for the partial match search processing will be described.

Figure 19:
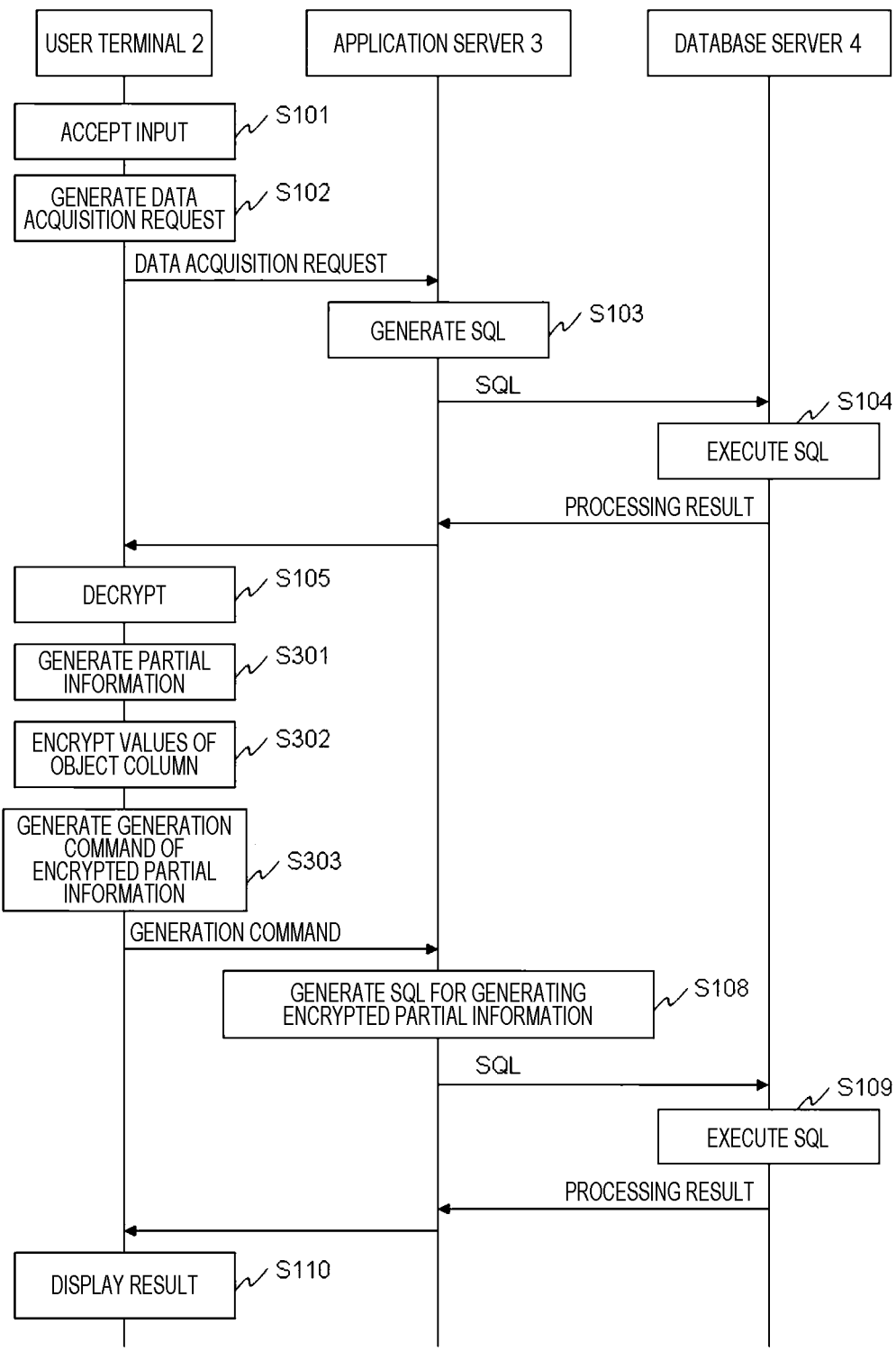
FIG. 19 is a sequence diagram for explaining a flow of preparatory processing for partial match search of the second embodiment.
Figure 20:
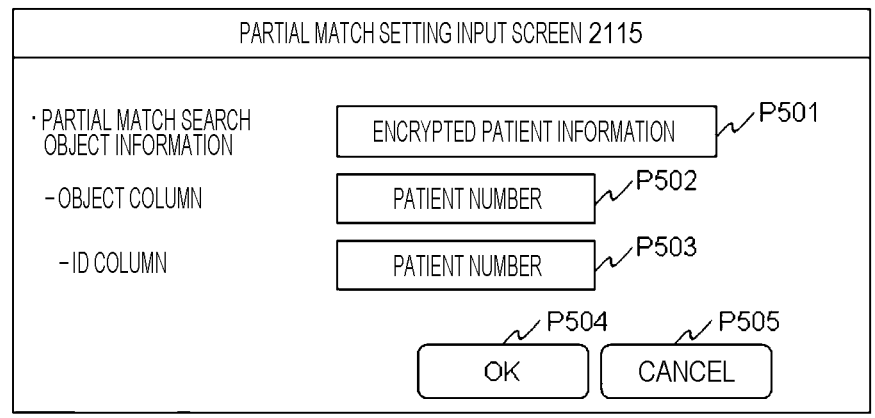
FIG. 20 is a diagram illustrating an example of a partial match setting input screen of the second embodiment.
Figure 21:
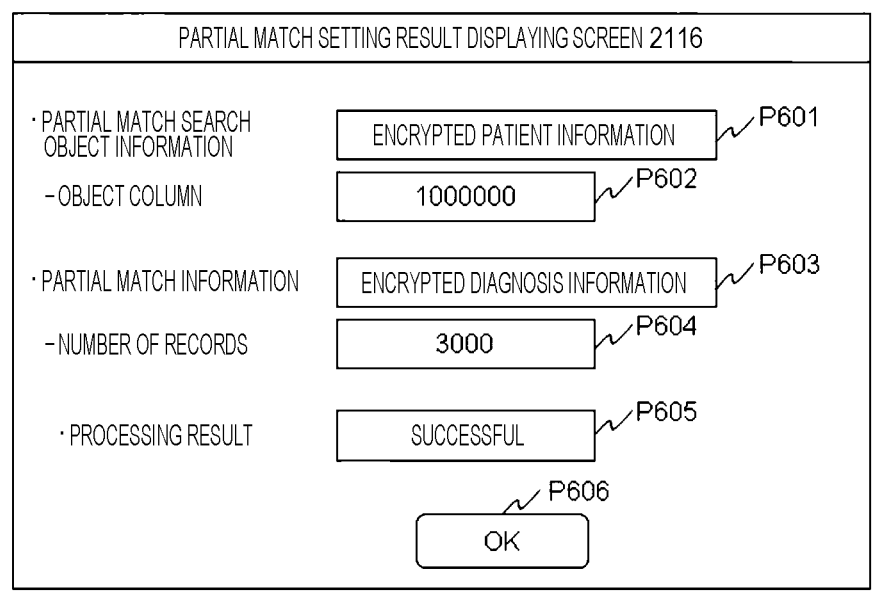
FIG. 21 is a diagram illustrating an example of a partial match setting result displaying screen of the second embodiment.

FIG. 19 is a sequence diagram for explaining a flow of preparatory processing for partial match search processing of the second embodiment. FIG. 20 is a diagram illustrating an example of a partial match setting input screen 2115 of the second embodiment. FIG. 21 is a diagram illustrating an example of a partial match setting result displaying screen 2116 of the second embodiment.

The user terminal 2, the application server 3, and the database server 4 execute the preparatory processing for the partial match search processing in cooperation with each other.

A flow of processing from step S101 to step S105 is the same as the flow of the processing of the first embodiment. However, the contents of processing of each step are partially different.

In step S101 of the second embodiment, information input by the user is different from that of the first embodiment. In the second embodiment, the user inputs information and a column to be subjected to partial match search processing by using the partial match setting input screen 2115 as illustrated in FIG. 20.

Here, the partial match setting input screen 2115 will be described. The partial match setting input screen 2115 is displayed on a display device 220 by a browser 211.

The partial match setting input screen 2115 includes a plurality of input forms (P501), (P502), and (P503) for accepting input of information necessary for the partial match search processing. The partial match setting input screen 2115 further includes an OK button (P504) and a cancel button (P505).

The input form (P501) allows for input of the name of object information of the partial match search processing.

The input form (P502) allows for input of the name of an object column of the partial match search processing. The input form (P503) allows for input of the name of a column designating a record from which a value the column value is read out on the basis of a processing result of the partial match search processing.

The OK button (P504) is an operation button for confirming values input to the respective input forms. The cancel button (P505) is an operation button for canceling confirmation of the values input to the respective input forms.

In FIG. 20, "encrypted patient information" is input as object information of the partial match search processing, the "name" column is input as an object column of the partial match search processing, and the "ID" column is input as a column for designating a record from which a value of the column is read out.

The above is description of the partial match setting input screen 2115. Let us return to the description of FIG. 19.

In step S102 of the second embodiment, the combination object column determining processing is not executed.

In step S103 of the second embodiment, an SQL generating unit 312 generates SQL for reading values of an object column included in the data acquisition request on the basis of values input on the partial match setting input screen 2115.

The contents of processing of steps S104 and S105 of the second embodiment are the same as those of the first embodiment.

The user terminal 2 generates the partial information 2101 using plaintext data decrypted in step S105 (step S301). In a case where values as illustrated in FIG. 20 are input to the partial match setting input screen 2115, the following processing is executed.

The user-side additional processing unit 216 calls the partial information generating unit 2161. At this time, the user-side additional processing unit 216 inputs a pair of values of the "ID" column and the "name" column of the "encrypted patient information 4613" to the partial information generating unit 2161.

The partial information generating unit 2161 executes the partial information generating processing on the basis of the input values. As a result, the partial information 2101 illustrated in FIG. 15 is generated. Details of the partial information generating processing will be described with reference to FIG. 22. The above is description of the processing of step S301.

Next, the user terminal 2 encrypts the value of the object column of the partial match search processing of the partial information 2101 (step S302). Specifically, processing as the following is executed.

The user-side additional processing unit 216 acquires key information from a key management unit 215 and transmits the key information and the partial information generating unit 2161 to an encryption unit 212.

The encryption unit 212 encrypts the value of the object column of the partial match search processing out of columns included in the partial information 2101 using the key information. The decryption unit 213 transmits the partial information 2101 in which the value of the object column of the partial match search processing is encrypted to the user-side additional processing unit 216. The above is description of the processing of step S302.

Next, the user terminal 2 generates a generation command for generating the encrypted partial information 4622 (step S303).

Specifically, the user-side additional processing unit 216 generates a generation command for registering the encrypted partial information 2101 received from the encryption unit 212 as the encrypted partial information 4622 and transmits the command to the application server 3.

After the processing of step S303, processing from step S108 to step S110 is executed. A flow of processing from step S108 to step S110 is the same as the flow of the processing of the first embodiment. However, the contents of processing of each step are partially different.

In step S108 of the second embodiment, the SQL generating unit 312 generates SQL for generating the encrypted partial information 4622 using each piece of information included in the generation command.

In step S109 of the second embodiment, a database control unit 411 generates the encrypted partial information 4622 in the database-side additional information group 462 by executing the received SQL.

In step S110 of the second embodiment, the browser 211 displays a partial match setting result displaying screen 2116 as illustrated in FIG. 21 on the display device 220 on the basis of result displaying information.

Here, the partial match setting result displaying screen 2116 will be described. The partial match setting result displaying screen 2116 is displayed on the display device 220 by the browser 211.

The partial match setting result displaying screen 2116 includes display forms (P601), (P602), (P603), (P604), and (P605) indicating the values input to the partial match setting input screen 2115 and an execution result of SQL. The partial match setting result displaying screen 2116 further includes an OK button (P606).

The display form (P601) displays the name of the object information of the partial match search processing input on the partial match setting input screen 2115. The display form (P602) displays the name of the object column of the partial match search processing input on the partial match setting input screen 2115.

The display form (P603) displays the name of the encrypted partial information 4622. The display form (P604) displays the number of records included in the encrypted partial information 4622. The display form (P605) indicates a generation result of the encrypted partial information 4622. Either "successful" or "failed" is displayed in the display form (P605).

The OK button (P606) is an operation button for instructing termination of the display.

For example in a case where values as illustrated in FIG. are input, the display form (P601) displays "encrypted patient information," the display form (P602) displays "name," the display form (P603) displays "name_partial information," the display form (P604) displays "8000," and the display form (P605) displays "successful." When the user presses the OK button (P606), the display of the partial match setting result displaying screen 2116 is terminated.

The above is description of the partial match setting result displaying screen 2116. Let us return to the description of FIG. 19.

The user terminal 2 may store the processing result in the user-side additional information group 262 as required, or may transmit the processing result to the application server 3 or the database server 4. Note that the processing result includes a correspondence relation between the encrypted partial information 4622 and the partial information 2101 and other information. The above is description of the flow of the preparatory processing for the partial match search processing.

Figure 22:
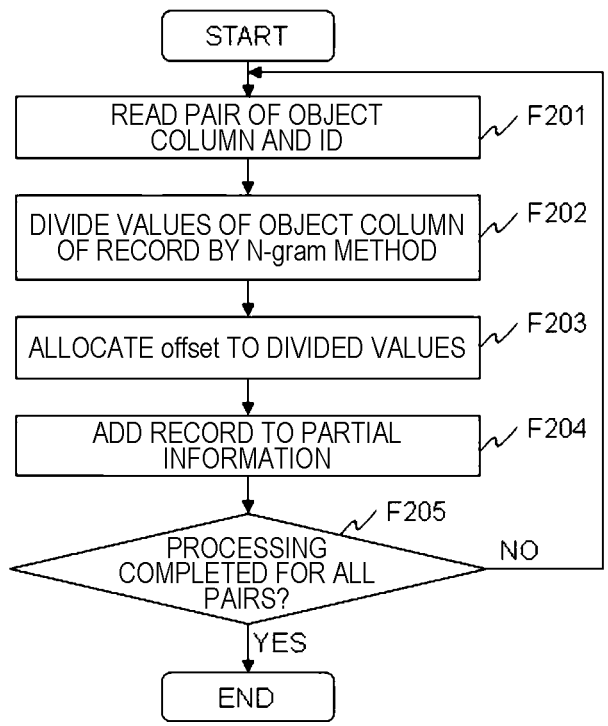
FIG. 22 is a flowchart for explaining an example of partial information generating processing executed by a partial information generating unit of the second embodiment.

FIG. 22 is a flowchart for explaining an example of partial information generating processing executed by the partial information generating unit 2161 of the second embodiment.

When called from the user-side additional processing unit 216, the partial information generating unit 2161 initiates partial information generating processing described below. Note that in the partial information generating unit 2161, a pair of a value of the "ID" column which is plaintext data and a value of the object column of the partial match search processing is input.

First, the partial information generating unit 2161 reads out one pair (step F201).

For example, the partial information generating unit 2161 reads out one pair in an ascending order of ID values. When a pair of values of the "ID" column and the "name" column of the encrypted patient information 4613 is input, the partial information generating unit 2161 reads out a pair an ID of which is "1" and the name is "Suzuki Taro."

Next, the partial information generating unit 2161 divides the value of the object column of the partial match search processing using an N-gram method (step F202).

For example, in a case of using an N-gram method where N=2, the value of the name "Suzuki Taro" is divided into three of "Suzuki," "Kita," and "Taro."

Next, the partial information generating unit 2161 assigns an offset indicating a division position from the head of the value before division to each of the divided values (step F203).

For example, offset "0" is assigned to "Suzuki," offset "1" is assigned to "Kita," and offset "2" is assigned to "Taro."

Next, the partial information generating unit 2161 adds a record including a divided value, an ID, and offset to the partial information 2101 (step F204).

For example, in a case where the divided values are "Suzuki," "Kita," and "Taro," the following three records are added to the partial information 2101.

| Partial Information | ID | offset value |
|---|---|---|
| Record 1: Suzuki | 1 | 0 |
| Record 2: Kita | 1 | 1 |
| Record 3: Taro | 1 | 2 |

Next, the partial information generating unit 2161 determines whether the processing has been completed for all the pairs (step F205).

If it is determined that the processing has not been completed for all the pairs, the partial information generating unit 2161 returns to step F201 and executes similar processing.

When it is determined that the processing has been completed for all the pairs, the partial information generating unit 2161 terminates the processing. The above processing results in generation of the partial information 2101 as illustrated in FIG. 15.

By preparing information including ID for execution of the partial match search processing, the user terminal 2 can narrow down partially matching IDs and acquire encrypted data corresponding to the IDs in the partial match search processing. The above is description of the preparatory processing for the partial match search processing.

(2-3) Details of Partial Match Search Processing

Next, details of the partial match search processing will be described with reference to FIGS. 23, 24, 25, 26, and 27.

Figure 23:
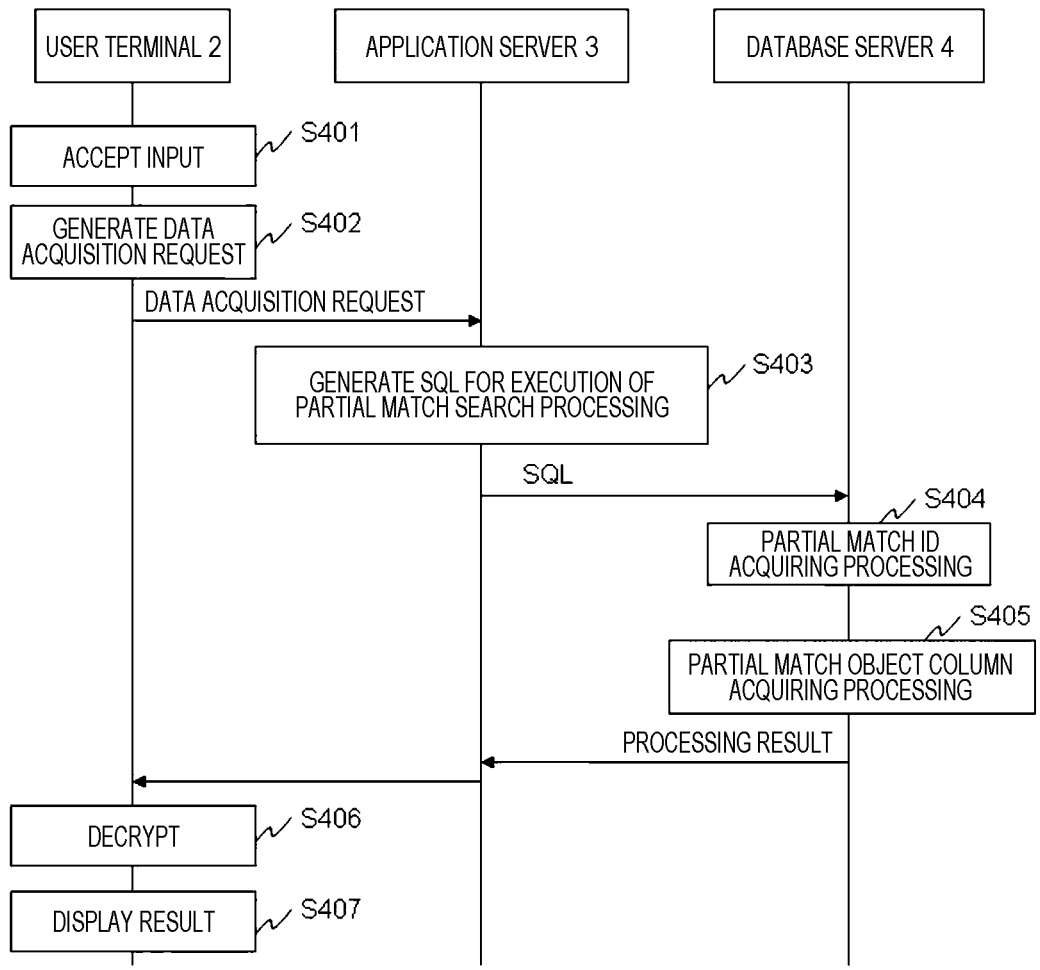
FIG. 23 is a sequence diagram illustrating a flow of processing of partial match search of the second embodiment.

FIG. 23 is a sequence diagram illustrating a flow of the partial match search processing of the second embodiment.

Figure 24:
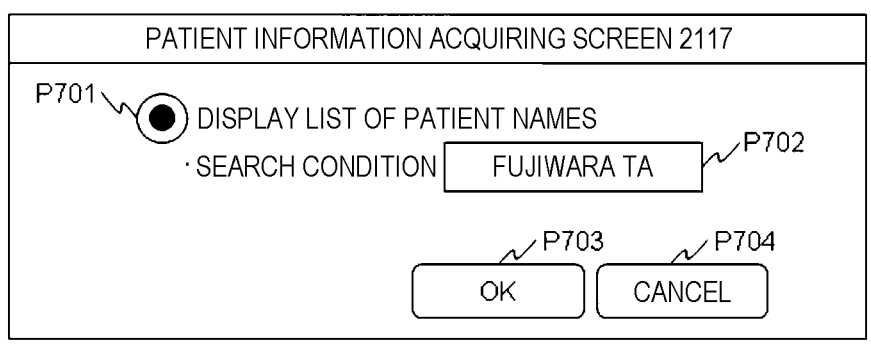
FIG. 24 is a diagram illustrating an example of a patient information acquiring screen of the second embodiment.
Figure 25:
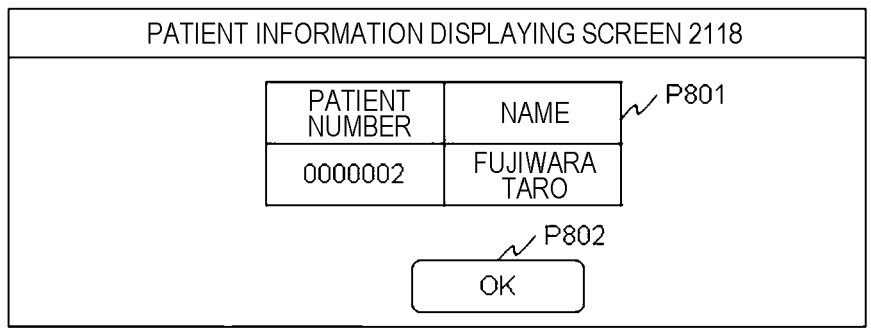
FIG. 25 is a diagram illustrating an example of a patient information displaying screen of the second embodiment.

FIG. 24 is a diagram illustrating an example of a patient information acquiring screen 2117 of the second embodiment. FIG. 25 is a diagram illustrating an example of a patient information displaying screen 2118 of the second embodiment.

The user terminal 2, the application server 3, and the database server 4 execute the partial match search processing in cooperation with each other. The partial match search processing is initiated when the user terminal 2 accepts input from the user.

First, the user terminal 2 accepts input from the user (step S401).

For example, the user inputs a part of a name as a search term using the patient information acquiring screen 2117 as illustrated in FIG. 24. It is assumed that a doctor who has saved sensitive information operates the user terminal 2 to request corresponding patient information to be displayed using a part of a patient's name as a search term.

Here, the patient information acquiring screen 2117 will be described. The patient information acquiring screen 2117 is displayed on the display device 220 by the browser 211.

The patient information acquiring screen 2117 includes a radio button (P701) and an input form (P702). The patient information acquiring screen 2117 further includes an OK button (P703) and a cancel button (P704).

The radio button (P701) is for selecting a format of data to be displayed. The input form (P702) allows for input of a search term.

The OK button (P703) is an operation button for confirming input. The cancel button (P704) is an operation button for canceling confirmation of input.

For example, the user operates the radio button (P301), inputs a search term in the input form (P302), and presses the OK button (P703).

The above is description of the patient information acquiring screen 2117. Let us return to the description of FIG. 23.

Next, the user terminal 2 generates a data acquisition request for acquiring information matching the search term (step S402). Specifically, processing as the following is executed.

The user-side additional processing unit 216 specifies a type of operation necessary for acquisition of requested information. The user-side additional processing unit 216 specifies names of an object information and an object column. The user-side additional processing unit 216 further specifies the encrypted partial information 4622 for storing a search query used for the encryption match determining processing. The user-side additional processing unit 216 inputs the input search term to the partial match search query generating unit 2162, and instructs execution of the partial match search query generating processing.

The partial match search query generating unit 2162 generates partial match search query information 2102 by executing partial match search query generating processing. For example, in a case where a search term of "Fujiwara Ta" is input, partial match search query information 2102 as illustrated in FIG. 15 is generated. Note that details of the partial match search query generating processing will be described with reference to FIG. 26.

The partial match search query generating unit 2162 transmits the partial match search query information 2102 to the user-side additional processing unit 216.

The user-side additional processing unit 216 generates a data acquisition request including the type of operation, the name of the object information, the name of the object column, identification information of the encrypted partial information 4622, the partial match search query information 2102, and a read command and transmits the data acquisition request to the application server 3. The above is description of the processing of step S402.

Next, the application server 3 generates SQL for executing partial match search processing on encrypted data (step S403). Specifically, processing as the following is executed.

When receiving the data acquisition request, the application unit 311 transmits the data acquisition request to the SQL generating unit 312.

The SQL generating unit 312 refers to the SQL definition information 361 and specifies a record, request processing 3612 of which matches the type of operation included in the data acquisition request. In this case, a record a definition ID 3611 of which is "2" is specified.

The SQL generating unit 312 generates SQL on the basis of the name of the column, the name of the information, the partial match search query information 2102 included in the data acquisition request as well as an SQL definition 3613 of the specified record. In the present embodiment, SQL of the partial match ID acquiring processing and SQL of the partial match object column acquiring processing are generated. The SQL generating unit 312 transmits the generated SQL to the application unit 311.

The application unit 311 transmits the SQL to the database server 4 via the database interface unit 313.

In a case where information as illustrated in FIG. 24 is input, the SQL generating unit 312 generates SQL (G) and (H) as follows.

SQL (G)
SELECT Partial Match ID Acquisition (Name_Partial Information,
Like ID Information_001, Partial Match Search Query EQ);

SQL (H)
SELECT Patient Number, Name FROM Encrypted Patient Information
JOIN Like ID Information_001
ON (Encrypted Patient Information.ID=Like ID Information_001.ID);

SQL (G) is SQL of partial match ID acquiring processing. The SQL (G) means to instruct the partial match ID acquiring unit 4131 to execute the partial match ID acquiring processing and to thereby output an ID matching the partial match search query from the encrypted partial information 4622 to the Like ID Information_001.

SQL (H) is SQL of partial match object column acquiring processing. SQL (H) means to output a record by combining the encrypted patient information 4613 and the Like ID Information_001 and to read out values of the "patient number" column and the "name" column of the record. The above is description of step S403.

Next, when receiving the SQL from the application server 3, the database server 4 executes the partial match ID acquiring processing and the partial match object column acquiring processing (steps S404 and S405) on the basis of the SQL. Specifically, processing as the following is executed.

The database control unit 411 executes the SQL of the partial match ID acquiring processing and executes the SQL of the partial matching object column acquiring processing.

Here, a case where the received SQL is SQL (G) and (H) will be described as an example.

First, the database control unit 411 instructs the partial match ID acquiring unit 4131 of the database-side additional processing unit 413 to execute the partial match ID acquiring processing on the basis of SQL (G). As a result, an ID is stored in the Like ID Information_xxx 4623. Details of the partial match ID acquiring processing will be described with reference to FIG. 27.

on the basis of SQL (H), the database control unit 411 outputs a record having the "ID" column that matches the ID stored in the Like ID Information_xxx 4623 from the encrypted patient information 4613 and acquires values of the "patient number" column and the "name" column of the record. The database control unit 411 stores an acquisition result in the memory 410 as the temporary information 4102.

The database control unit 411 transmits a processing result including the temporary information 4102 to the application server 3. The above is description of the processing of step S404 and step S405.

Next, when receiving the processing result, the user terminal 2 decrypts the processing result (step S406).

Specifically, when receiving the processing result including the temporary information 4102, the user-side additional processing unit 216 acquires key information from the key management unit 215 and transmits the temporary information 4102 and the key information to the decryption unit 213. The decryption unit 213 acquires plaintext data by decrypting values of a column included in the temporary information 4102 using the key information. The decryption unit 213 transmits the plaintext data to the user-side additional processing unit 216. The user-side additional processing unit 216 transmits the plaintext data to the browser 211.

Next, the user terminal 2 displays a result of the series of processing to the user (step S407).

Specifically, the browser 211 generates display information for displaying the processing result including the plaintext data and displays the patient information displaying screen 2118 as illustrated in FIG. 25 on the display device 220 on the basis of the display information.

Here, the patient information displaying screen 2118 will be described. The patient information displaying screen 2118 is displayed on the display device 220 by the browser 211.

The patient information displaying screen 2118 includes a list of search results (P801). The patient information displaying screen 2118 further includes an OK button (P802).

The list of search results (P801) illustrated in FIG. 25 includes one record including the "patient" column and the "name" column. The record indicates a patient whose patient number is "0000002" and the name is "Fujiwara Taro." The OK button (P802) is an operation button for instructing termination of the display.

The above is description of the patient information displaying screen 2118. Moreover, the above is description of the flow of the partial match search processing.

Figure 26:
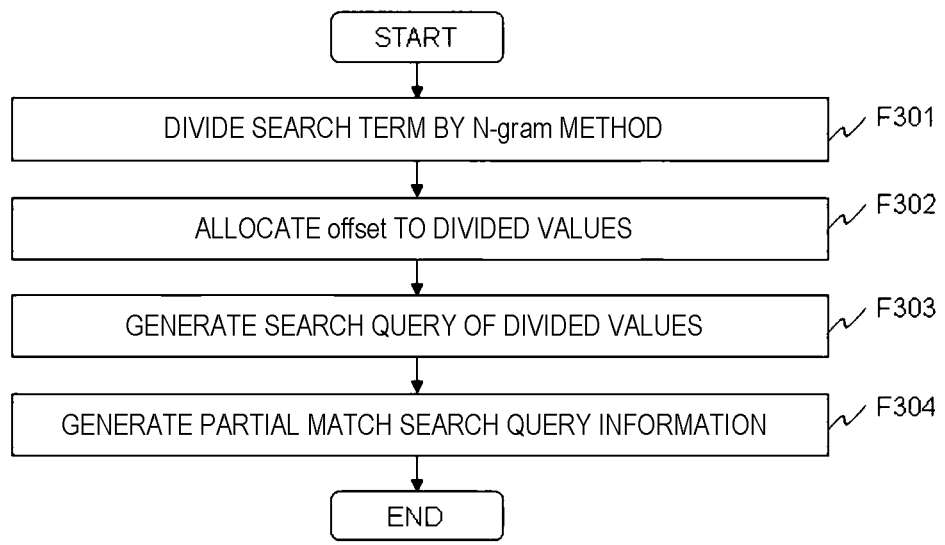
FIG. 26 is a flowchart for explaining an example of partial match search query generating processing executed by a partial match search query generating unit of the second embodiment.

FIG. 26 is a flowchart illustrating an example of partial match search query generating processing executed by the partial match search query generating unit 2162 of the second embodiment.

When a search term is input, the partial match search query generating unit 2162 initiates the partial match search query generating processing described below.

First, the partial match search query generating unit 2162 divides the search term using the N-gram method (step F301).

In the case of using the N-gram method where N=2, the search term "Fujiwara Ta" is divided into two parts of "Fujiwara" and "Wara Ta."

Next, the partial match search query generating unit 2162 assigns an offset indicating a division position from the head of the value before the division to each of the divided values (step F302).

For example, in a case where a search term is "Fujiwara Ta," an offset of "0" is assigned to "Fujiwara," and an offset of "1" is assigned to "Wara Ta."

Next, the partial match search query generating unit 2162 generates search queries (step F303).

Specifically, the partial match search query generating unit 2162 acquires key information from the key management unit 215 and transmits the divided values and the key information to the encrypted search query generating unit 214. The encrypted search query generating unit 214 generates search queries by encrypting each of the divided values using the key information and transmits the search queries to the partial match search query generating unit 2162.

For example, "EncQuery (Fujiwara)" and "EncQuery (Wara Ta)" are generated from "Fujiwara" and "Wara Ta."

Next, the partial match search query generating unit 2162 generates the partial match search query information 2102 (step F304).

Specifically, the partial match search query generating unit 2162 generates the partial match search query information 2102 including a plurality of records including the divided values, the offsets of the divided values, and search queries of the divided values.

For example, in a case where the search term "Fujiwara Ta" is input, the partial match search query information 2102 including the following two records is generated.

| Partial match search query | offset |
|---|---|
| Record 1: EncQuery (Fujiwara) | 0 |
| Record 2: EncQuery (Wara Ta) | 1 |

Through the above processing, the partial match search query information 2102 as illustrated in FIG. 15 is stored in the memory 210.

Figure 27:
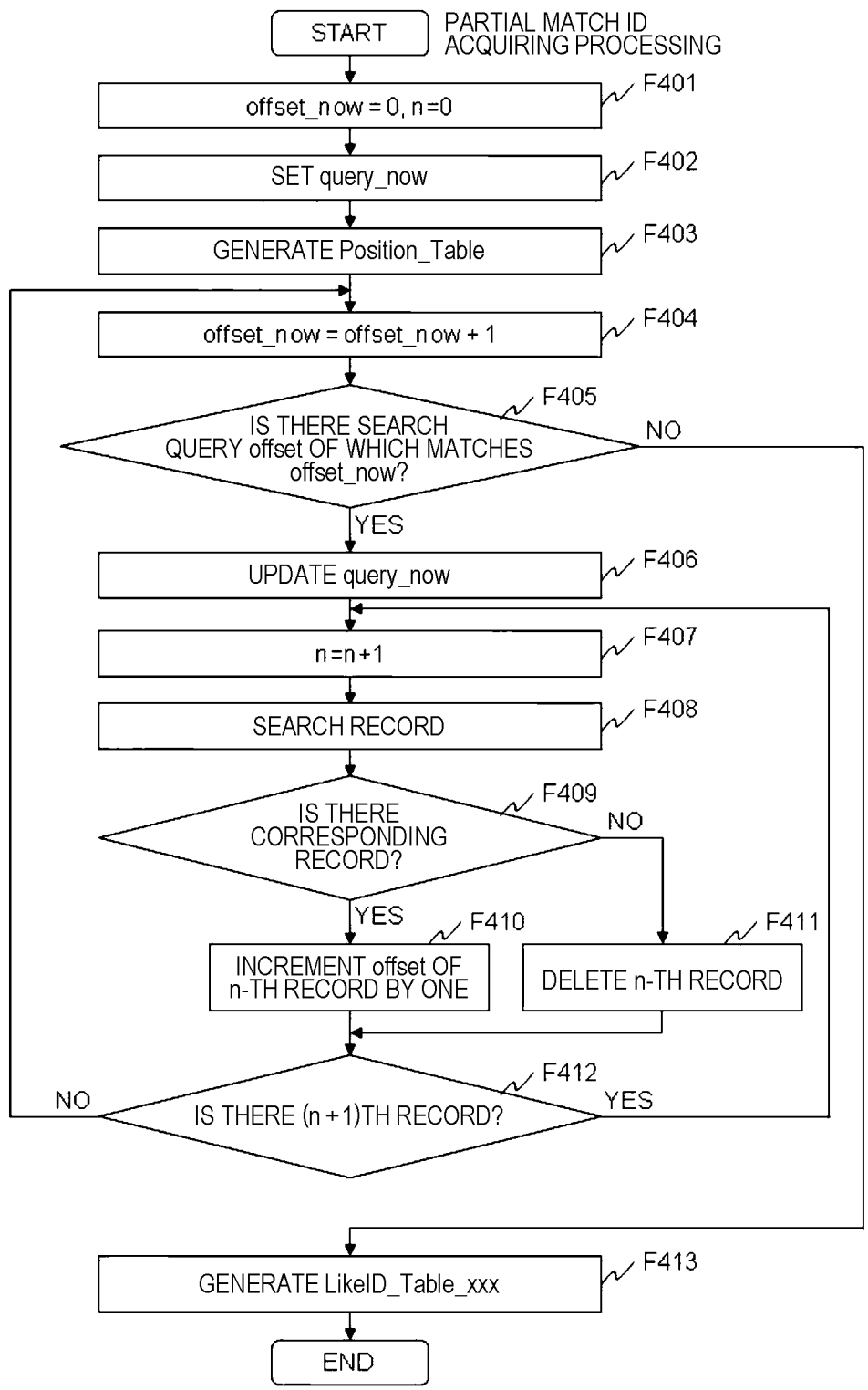
FIG. 27 is a flowchart for explaining an example of partial match ID acquiring processing executed by a partial match ID acquiring unit of the second embodiment.

FIG. 27 is a flowchart illustrating an example of partial match ID acquiring processing executed by the partial match ID acquiring unit 4131 of the second embodiment.

The partial match ID acquiring unit 4131 executes the partial match ID acquiring processing described below when reading from the database-side additional processing unit 413 is performed. Note that, in the partial match ID acquiring unit 4131, the name of the encrypted partial information 4622, the name of the Like ID Information_xxx 4623, and partial match search queries are input.

First, the partial match ID acquiring unit 4131 sets "0" as an initial value in a variable offset_now indicating the current position information and a variable n indicating the count (step F401).

Next, the partial match ID acquiring unit 4131 sets a variable query_now indicating an object partial match search query (step F402).

Specifically, the partial match ID acquiring unit 4131 retrieves a partial match search query a value of the "offset" column of which matches offset_now from the partial match search query information 2102. The partial match ID acquiring unit 4131 sets the retrieved partial match search query to query_now.

For example in a case where offset_now is "0," a partial match search query "EncQuery (Fujiwara)" of a record having "0" in the "offset" column is set to query_now.

Next, the partial match ID acquiring unit 4131 generates Position_Table (step F403). Specifically, processing as the following is executed.

The partial match ID acquiring unit 4131 calls the encryption match determining unit 412 and retrieves a record a value in the "partial information" column of which matches query_now from the encrypted partial information 4622.

The partial match ID acquiring unit 4131 generates a Position_Table including a record including columns storing the value of the "ID" column of the retrieved record and a value obtained by adding "1" to the value of the "offset" column. The partial match ID acquiring unit 4131 stores Position_Table in the memory 410.

For example, in a case where the encrypted partial information 4622 is the encrypted partial information 4622 illustrated in FIG. 17 and query_now is "EncQuery (Fujiwara)," Position_Table including a record a value of the "ID" column of which is "2" and having a value obtained by adding "1" to the value of the "offset" column is generated. Specifically, Position_Table contains a record as follows. The above is description of the processing of step F403.

| (Position_Table) | | |
|---|---|---|
| | ID | offset |
| Record 1: | 2 | 1 |

Next, the partial match ID acquiring unit 4131 updates offset_now (step F404).

Specifically, the partial match ID acquiring unit 4131 adds "1" to the current offset_now.

Next, the partial match ID acquiring unit 4131 determines whether there is a partial match search query in which a value of the "offset" column matches offset_now in the partial match search query information 2102 (step F405).

Specifically, the partial match ID acquiring unit 4131 refers to the partial match search query information 2102 and determines whether there is a partial match search query a value in the "offset" column of which matches offset_now.

If it is determined that there is a partial match search query a value in the "offset" column of which matches offset_now, the partial match ID acquiring unit 4131 updates query_now (step F406).

Specifically, the partial match ID acquiring unit 4131 sets the retrieved partial match search query to query_now. For example, in a case where "EncQuery (Fujiwara)" is set to query_now before the update, offset_now is updated to "1" in step F404. Therefore, "EncQuery (Wara Ta)" is set to query_now.

Next, the partial match ID acquiring unit 4131 updates n (step F407).

Specifically, the partial match ID acquiring unit 4131 adds "1" to the current n.

Next, the partial match ID acquiring unit 4131 retrieves a record satisfying the condition from the encrypted partial information 4622 (step F408). Specifically, processing as the following is executed.

The partial match ID acquiring unit 4131 retrieves a record in which values of the "ID" column and the "offset" column of the encrypted partial information 4622 match values of the "ID" column and the "offset" column, respectively, of an nth record of a Position_Table and a value of the "partial information" column of the encrypted partial information 4622 matches query_now. Note that the determination of the match between the value of the "partial information" column of the encrypted partial information 4622 and query_now is performed by the encryption match determining unit 412.

For example, when n is "1," the Position_Table includes the record exemplified in step F403. In this case, the partial match ID acquiring unit 4131 retrieves a record in which a value of the "ID" column is "2," a value of the "offset" column is "1," and the "name_partial information" column includes "EncQuery (Wara Ta)". The partial match ID acquiring unit 4131 acquires a record as the following as a search result. The above is description of the processing of step F408.

| (Search Result) | | | |
|---|---|---|---|
| | Name_partial information | ID | offset |
| Record 1: | "Enc (Wara Ta)" | 2 | 1 |

Next, the partial match ID acquiring unit 4131 determines whether there is a record satisfying the condition on the basis of the search result (step F409).

When it is determined that there is a record satisfying the condition, the partial match ID acquiring unit 4131 adds "1" to the value of the "offset" column of the nth record of the Position_Table (step F410). Thereafter, the partial match ID acquiring unit 4131 proceeds to step F412.

For example, where n is "1," the value of the "offset" column of the first record 1 of the Position_Table exemplified in step F403 is "2."

If it is determined that there is no record satisfying the condition, the partial match ID acquiring unit 4131 deletes the nth record of the Position_Table (step F410). Thereafter, the partial match ID acquiring unit 4131 proceeds to step F412.

Next, the partial match ID acquiring unit 4131 determines whether there is an (n+1)th record in the Position_Table (step F412).

If it is determined that there is an (n+1)th record in the Position_Table, the partial match ID acquiring unit 4131 returns to step F407 and executes similar processing.

When it is determined that there is no (n+1)th record in the Position_Table, the partial match ID acquiring unit 4131 returns to step F404 and executes similar processing.

In step F405, if it is determined that there is no partial match search query a value in the "offset" column of which matches offset_now, the partial match ID acquiring unit 4131 generates Like ID Information_xxx 4623 (step F413). Thereafter, the partial match ID acquiring unit 4131 terminates the partial match ID acquiring processing.

Specifically, the partial match ID acquiring unit 4131 deduplicates values of the "ID" column of the Position_Table and generates Like ID Information_xxx 4623 consisting of only a group of IDs. The partial match ID acquiring unit 4131 stores the generated Like ID Information_xxx 4623 in the database-side additional information group 462.

For example, as a result of processing the records exemplified in the respective steps, Like ID Information_xxx 4623 including the following record is generated.

| (Like ID Information_xxx) | |
|---|---|
| | ID |
| Record 1: | 2 |

The above is description of the partial match search processing.

(2-4) Effect of Second Embodiment

As described above, in the concealed database system 1 of the second embodiment, in a case where a partial search condition such as a part of a name is accepted on the basis of the encrypted combined information 4621 and the SQL definition information 361, a search result including partially matching information is transmitted to the user terminal 2 without decrypting encrypted information. Therefore, it is possible to implement a concealed database system capable of executing a database operation command for acquiring a record partially matching a column included in a record of a desired table while confidentiality of data is maintained.

Third Embodiment

A concealed database system 1 of a third embodiment is different from the first embodiment in that a function for implementing range search processing and sort processing is provided. The range search processing is for acquiring a record included in a specified range, and the sort processing is for rearranging records in accordance with a desired condition. Hereinafter, the third embodiment will be described with a focus on differences from the first embodiment.

(3-1) Configuration of Computer System of Third Embodiment

The concealed database system 1 of the third embodiment has the same configuration as that of the first embodiment, and thus description thereof is omitted. In addition, hardware configurations of a user terminal 2, an application server 3, and a database server 4 of the third embodiment are the same as those of the first embodiment, and thus description thereof is omitted.

In the third embodiment, a software configuration and the contents of the information held by each device are partially different.

First, a software configuration of the user terminal 2 will be described. The software configuration of the user terminal 2 of the second embodiment is the same as that of the user terminal 2 of the first embodiment. However, it is different from the first embodiment that a user-side additional processing unit 216 of the second embodiment has a function for implementing range search processing and sort processing.

FIG. 28 is a block diagram illustrating a logical configuration of the user-side additional processing unit 216 of the third embodiment.

The user-side additional processing unit 216 includes a corresponding range information generating unit 2163, a corresponding range label information generating unit 2164, a range search/sort query generating unit 2165, an out-of-range data deleting unit 2166, and a limited sort processing unit 2167.

The corresponding range information generating unit 2163 accepts information which is plaintext data and is related to an object column of range search processing/sort processing, assigns range labels to a plurality of sections obtained by dividing a range of values of the object column, measures the frequency of each of the sections and thereby generates corresponding range information 2621, and outputs the corresponding range information 2621.

The corresponding range label information generating unit 2164 accepts input of the name of the corresponding range information 2621 and values of the object column, acquires a range label corresponding to a value of the column from the corresponding range information 2621, and outputs the acquired range label.

The range search/sort query generating unit 2165 accepts input of a condition of the range search processing/sort processing which is plaintext data and outputs a search query of a range label corresponding to the condition.

The out-of-range data deleting unit 2166 deletes a record not corresponding to the condition of the range search processing/sort processing from a processing result of the range search processing/sort processing and outputs only a record corresponding to the condition.

The limited sort processing unit 2167 accepts, as input, the processing result of the range search processing/sort processing or a processing result of the range search processing/sort processing processed by the out-of-range data deleting unit 2166 and outputs a predetermined number of records rearranged in a specified order. Note that the number of records output (Limit number) is specified in advance by a user.

Next, a software configuration of the application server 3 will be described. The software configuration of the application server 3 of the third embodiment is the same as the software configuration of the application server 3 of the first embodiment.

In the third embodiment, the application server 3 generates SQL for implementing the range search processing/sort processing on the basis of an SQL definition 3613 a definition ID 3611 of which is "3." Here, the SQL definition 3613 a definition ID 3611 of which is "3" includes SQL (I) as follows.

SQL (I)

SELECT Patient Number, Name, Age FROM Range Information

WHERE Encryption Match Determination (Age_Range Label, EncQuery (300))='true'

OR Encryption Match Determination (Age_Range Label, EncQuery (400))='true';

SQL (I) means to read out values of the "patient number" column," the "name" column, and the "age" column from a group of records in which the "age_range label" column includes the search query "EncQuery (300)" or the search query "EncQuery (400)" from the encrypted corresponding range information 4624.

Next, a software configuration of the database server 4 will be described. The software configuration of the database server 4 of the third embodiment is the same as the software configuration of the database server 4 of the first embodiment.

Next, information contained in each of the components of the third embodiment will be described.

FIG. 29 is a diagram illustrating an example of a data structure of a user-side additional information group 262 of the third embodiment.

The user-side additional information group 262 of the second embodiment includes the corresponding range information 2621.

The corresponding range information 2621 includes a plurality of records including the "corresponding range" column, the "range label" column, and the "frequency" column.

The "corresponding range" column includes sections obtained by dividing a range of values of an object column of the range search processing/sort processing. In this embodiment, since range search processing specifying a range of ages is assumed, the corresponding range information 2621 includes an "age_corresponding range" column.

The "range label" column includes range labels assigned to sections. The "frequency" column includes the number of records in which a value of a column corresponding to the "age_corresponding range" column is included in that section.

For example, the uppermost record of the corresponding range information 2621 indicates ages in a "section of 0 to 9 years old," a range label of "100," and that the number of records a value of the "age" column of which is included in that section is "2."

FIG. 30 is a diagram illustrating an example of a data structure of data temporarily stored in a memory 210 of the third embodiment.

The memory 210 of the third embodiment includes range search query information 2103.

The range search query information 2103 includes a plurality of records storing search queries generated on the basis of a condition of range search processing/sort processing. The records include a "search query" column. The search queries of this embodiment are used in the encryption match determining processing executed in the range search processing.

The range search query information 2103 illustrated in FIG. 30 includes a record of a search query of "EncQuery (300)" and a record of a search query "EncQuery (400)."

FIG. 31 is a diagram illustrating an example of a data structure of an encrypted main information group 461 of the third embodiment.

The encrypted main information group 461 of the third embodiment includes encrypted patient information 4614.

The encrypted patient information 4614 is a list of patients and includes a plurality of records including an "ID" column, a "patient number" column, a "name" column, and an "age" column.

The "ID" column, the "patient number" column, and the "name" column are the same as the "ID" column, the "patient number" column, and the "name" column of the encrypted patient information 4611 of the first embodiment, respectively. The "age" column includes ages of patients.

For example, the uppermost record of the encrypted patient information 4614 indicates that the name of a patient whose patient number is "Enc (0000001)" is "Enc (Suzuki)" and that the age is "Enc (4)."

FIG. 32 is a diagram illustrating an example of a data structure of a database-side additional information group 462 of the third embodiment.

The database-side additional information group 462 of the third embodiment includes encrypted corresponding range information 4624 used for range search processing/sort processing.

The encrypted corresponding range information 4624 includes a plurality of records including an "ID" column, a "patient number" column, a "name" column, an "age" column, and an "age_range label" column.

The "age_range label" column includes encrypted data to be compared with a search query in encryption match determining processing. For example, in the "age_range label" column of the uppermost record of the encrypted corresponding range information 4624, "Enc (100)" obtained by encrypting a range label of "100" of a section including "4" years old is stored.

The "ID" column, the "patient number" column, the "name" column, and the "age" column correspond to the "ID" column, the "patient number" column, the "name" column, and the "age" column of the encrypted patient information 4614, respectively.

FIG. 33 is a diagram illustrating an example of a data structure of temporary information 4103 temporarily stored in a memory 410 of the third embodiment.

The temporary information 4103 stores an execution result of SQL (I). Specifically, the temporary information 4103 stores values of the "patient number" column, the "name" column, and the "age" column of records matching a search query from the encrypted patient information 4614. Therefore, the temporary information 4103 includes one or more records including the "patient number" column, the "name" column, and the "age" column.

The uppermost record of the temporary information 4103 illustrated in FIG. 33 indicates that it is a record of a patient whose patient number is "Enc (0000005)," whose name is "Enc (Fujiwara)," and the age is "Enc (23)."

(3-2) Details of Preparatory Processing for Range Search Processing/Sort Processing Next, with reference to FIGS. 34, 35, 36, 37, and 38, details of preparatory processing for range search processing/sort processing for performing setting necessary for the range search processing/sort processing on encrypted information will be described.

Figure 34:
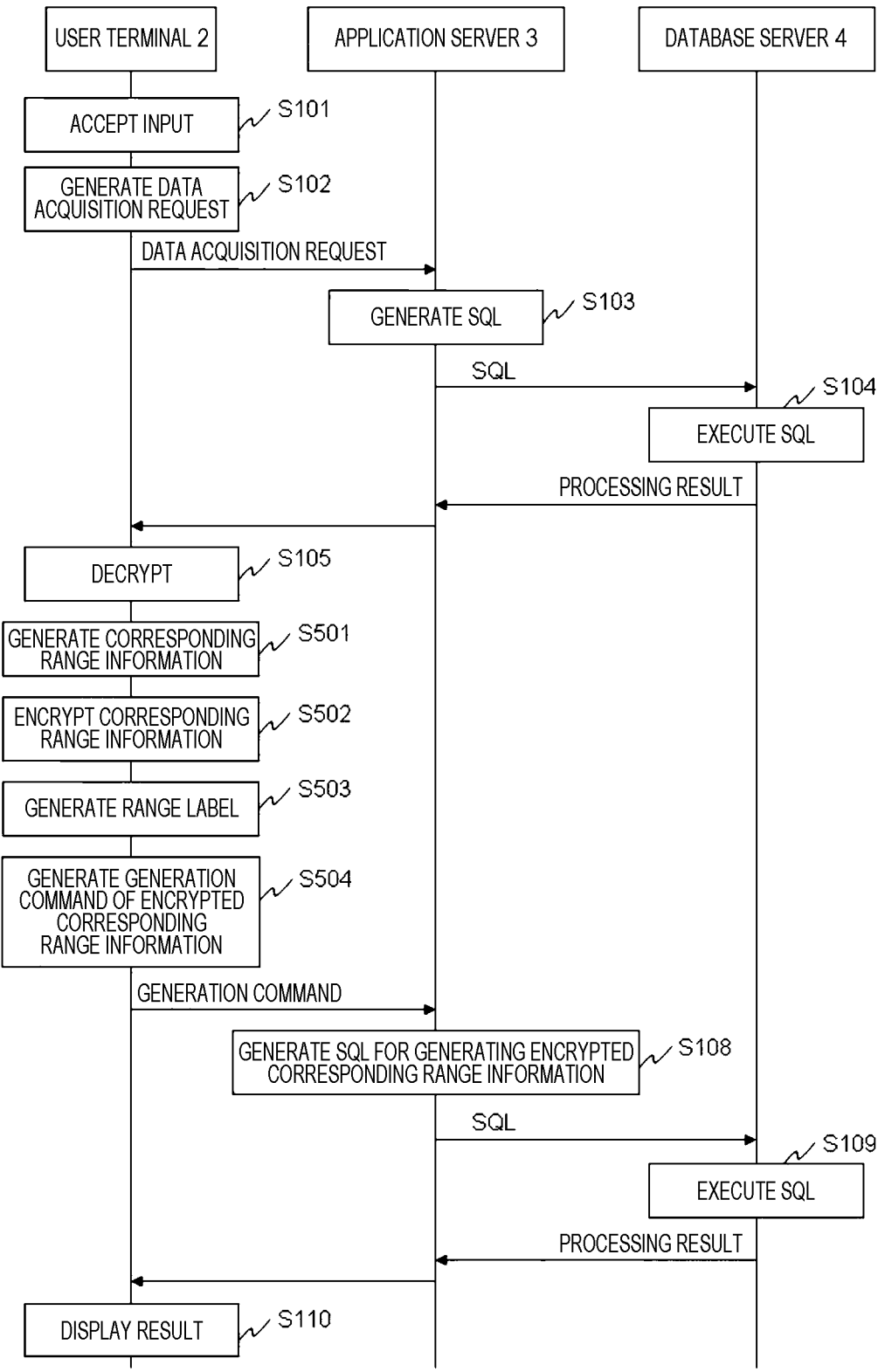
FIG. 34 is a sequence diagram for explaining a flow of preparatory processing for range search/sort of the third embodiment.
Figure 35:
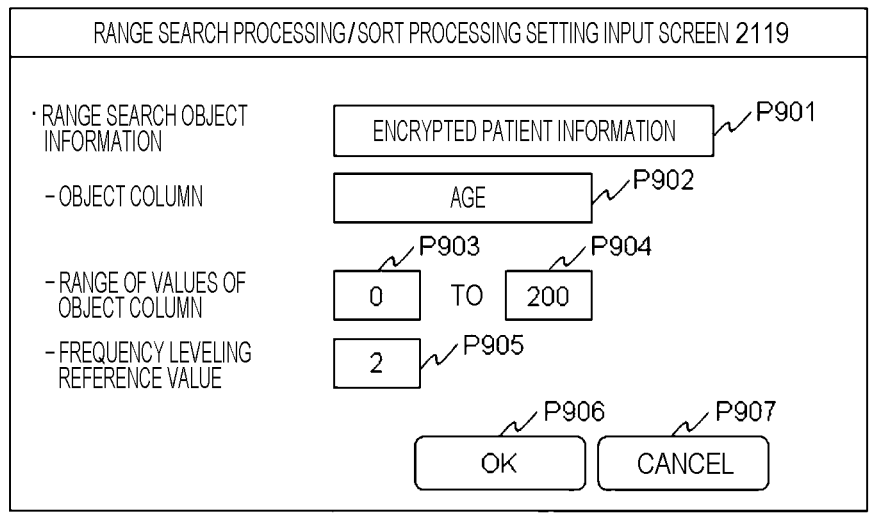
FIG. 35 is a diagram illustrating an example of a range search/sort setting input screen of the third embodiment.
Figure 36:
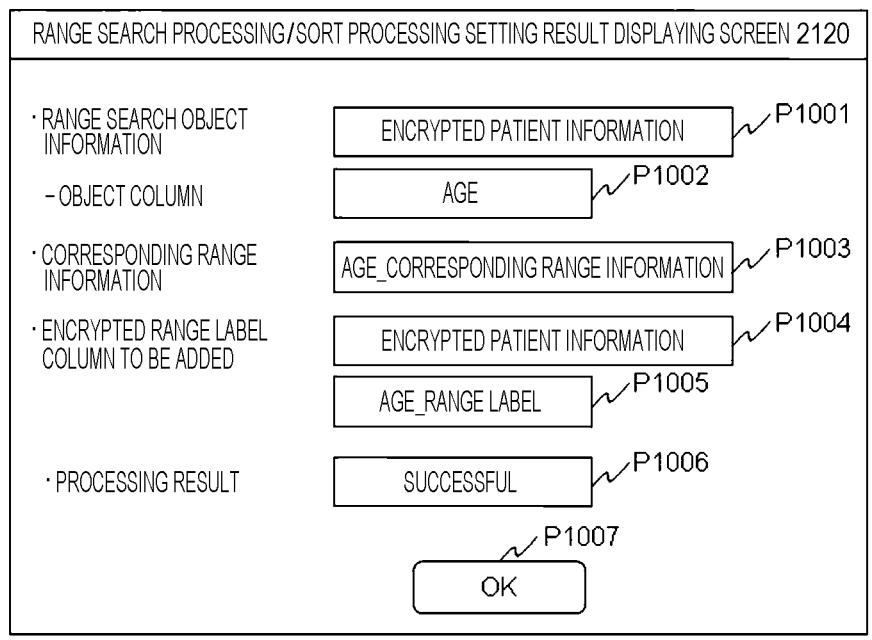
FIG. 36 is a diagram illustrating an example of a range search/sort setting result displaying screen of the third embodiment.

FIG. 34 is a sequence diagram for explaining a flow of preparatory processing for range search processing/sort processing of the third embodiment. FIG. 35 is a diagram illustrating an example of a range search processing/sort processing setting input screen 2119 of the third embodiment. FIG. 36 is a diagram illustrating an example of a range search processing/sort processing setting result displaying screen 2120 of the third embodiment.

The user terminal 2, the application server 3, and the database server 4 execute the preparatory processing for the range search processing/sort processing in cooperation with each other.

A flow of processing from step S101 to step S105 is the same as the flow of the processing of the first embodiment. However, the contents of processing of each step are partially different.

In step S101 of the third embodiment, information input by a user is different from that in the first embodiment. In the third embodiment, the user inputs information, a column, a range of values as objects of the range search processing/sort processing as well as a reference value for frequency leveling by using the range search processing/sort processing setting input screen 2119 as illustrated in FIG. 35.

Here, the range search processing/sort processing setting input screen 2119 will be described. The range search processing/sort processing setting input screen 2119 is displayed on a display device 220 by a browser 211.

The range search processing/sort processing setting input screen 2119 includes a plurality of input forms (P901), (P902), (P903), (P904), and (P905) for accepting input of information necessary for range search processing and sort processing. The range search processing/sort processing setting input screen 2119 further includes an OK button (P906) and a cancel button (P907).

The input form (P901) allows for input of the name of object information of the range search processing/sort processing. The input form (P902) allows for input of the name of an object column of the range search processing/sort processing.

The input form (P903) allows for input of a lower limit value of a range of values of the object column, and the input form (P904) allows for input of an upper limit value of the range of values of the object column. The input form (P905) allows for input of a reference value for leveling the number of records included in each section.

The OK button (P906) is an operation button for confirming values input to the respective input forms. The cancel button (P907) is an operation button for canceling confirmation of the values input to the respective input forms.

In FIG. 35, "encrypted patient information" and "age" are input as the information and the column as objects of the range search processing/sort processing, respectively, "0" to "200" is input as the range of values, and "2" is input as the frequency leveling reference value.

The above is description of the range search processing/sort processing setting input screen 2119. Let us return to the description of FIG. 34.

In step S102 of the third embodiment, the combination object column determining processing is not executed.

In step S103 of the third embodiment, an SQL generating unit 312 generates SQL for reading values of an object column included in a data acquisition request on the basis of the values input on the range search processing/sort processing setting input screen 2119.

The contents of processing of steps S104 and S105 of the third embodiment are the same as those of the first embodiment. When the processing of step S105 is completed, values of the "age" column of the encrypted patient information 4614 are stored in the memory 210 in a decrypted state.

The user terminal 2 generates the corresponding range information 2621 using plaintext data decrypted in step S105 (step S501).

Specifically, the user-side additional processing unit 216 calls the corresponding range information generating unit 2163. At this time, the user-side additional processing unit 216 inputs the values of the object column, the range of values of the object column, and the frequency leveling reference value to the corresponding range information generating unit 2163. The corresponding range information generating unit 2163 executes corresponding range information generating processing on the basis of the input values. As a result, the corresponding range information 2621 illustrated in FIG. 29 is generated. Details of the corresponding range information generating processing will be described with reference to FIG. 37.

Next, the user terminal 2 encrypts the corresponding range information 2621 (step S502). Specifically, processing as the following is executed.

The user-side additional processing unit 216 acquires key information from a key management unit 215 and transmits the corresponding range information 2621 and the key information to the encryption unit 212. The encryption unit 212 encrypts the corresponding range information 2621 using the key information and transmits the encrypted corresponding range information 2621 to the user-side additional processing unit 216. The user-side additional processing unit 216 generates a generation command for generating the encrypted corresponding range information 2621.

Next, the user terminal 2 generates a corresponding range label (step S503).

Specifically, the user-side additional processing unit 216 calls the corresponding range label information generating unit 2164. At this time, the user-side additional processing unit 216 inputs the plaintext data of the object column and the name of the corresponding range information 2621 before encryption. The corresponding range label information generating unit 2164 executes corresponding range label information generating processing on the basis of the input values. As a result, a range label corresponding to each section of the object column is generated. Details of the corresponding range label information generating processing will be described with reference to FIG. 38.

Next, the user terminal 2 generates a generation command for generating the encrypted corresponding range information 4624 (step S504). Specifically, processing as the following is executed.

The user-side additional processing unit 216 acquires key information from the key management unit 215 and inputs the range label generated in step S503 and the key information to an encrypted search query generating unit 214. The encrypted search query generating unit 214 generates a search query of the range label and transmits the generated search query to the user-side additional processing unit 216.

The user-side additional processing unit 216 generates an addition command for adding a column of the search query to the encrypted corresponding range information 2621.

The user-side additional processing unit 216 generates a generation command including information related to the encrypted corresponding range information 2621, a generation command of the information-encrypted corresponding range information 2621, the search query of the range label, and the addition command of the "search query" column. The user-side additional processing unit 216 transmits the generated generation command to the application server 3. The above is description of the processing of step S504.

After the processing of step S504, the processing from step S108 to step S110 is executed. A flow of processing from step S108 to step S110 is the same as the flow of the processing of the first embodiment. However, the contents of processing of each step are partially different.

In step S108 of the third embodiment, the SQL generating unit 312 generates SQL for generating the encrypted corresponding range information 4624 using the pieces of information included in the generation command.

In step S109 of the third embodiment, a database control unit 411 generates the encrypted corresponding range information 4624 in the database-side additional information group 462 by executing the received SQL.

In step S110 of the third embodiment, the browser 211 displays the range search processing/sort processing setting result displaying screen 2120 as illustrated in FIG. 36 on the display device 220 on the basis of result displaying information.

Here, the range search processing/sort processing setting result displaying screen 2120 will be described. The range search processing/sort processing setting result displaying screen 2120 is displayed on the display device 220 by the browser 211.

The range search processing/sort processing setting result displaying screen 2120 includes display forms (P1001), (P1002), (P1003), (P1004), (P1005), and (P1006) indicating information input to the range search processing/sort processing setting input screen 2119 and an execution result of the SQL. The range search processing/sort processing setting result displaying screen 2120 further includes an OK button (P1007).

The display form (P1001) displays the name of object information input to the range search processing/sort processing setting input screen 2119. The display form (P1002) displays the name of the object column input to the range search processing/sort processing setting input screen 2119.

The display form (P1003) displays the name of the corresponding range information 2621. The display form (P1004) displays the name of the encrypted corresponding range information 4624. The display form (P1005) displays the name of the column of the corresponding range information 2621 added as the search query.

The display form (P1006) displays a generation result of the encrypted corresponding range information 4624. Either "successful" or "failed" is displayed in the display form (P1006).

The OK button (P1007) is an operation button for commanding termination of the display.

The above is description of the range search processing/sort processing setting result displaying screen 2120. Let us return to the description of FIG. 34.

The user terminal 2 may store the processing result in the user-side additional information group 262 as required, or may transmit the processing result to the application server 3 or the database server 4. Note that the processing result includes a correspondence relation between the encrypted corresponding range information 4624 and the corresponding range information 2621. The above is description of the flow of the preparatory processing for the range search processing/sort processing.

Figure 37:
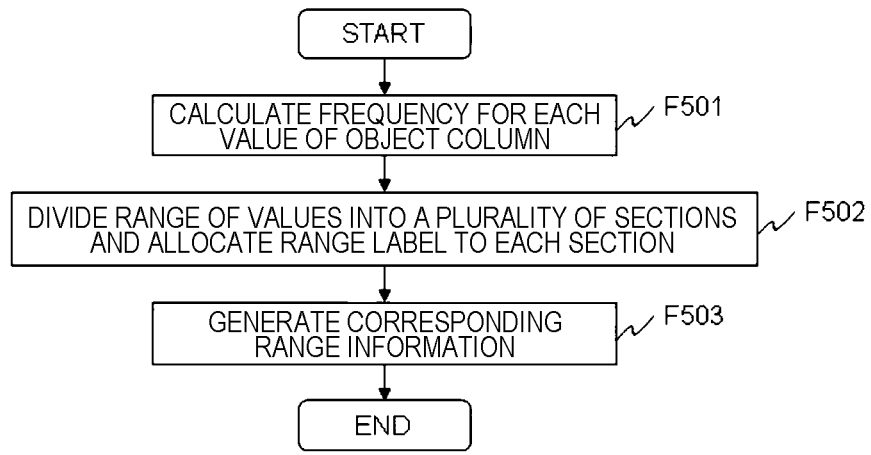
FIG. 37 is a flowchart for explaining a corresponding range information generating processing executed by a corresponding range information generating unit of the third embodiment.

FIG. 37 is a flowchart for explaining the corresponding range information generating processing executed by the corresponding range information generating unit 2163 of the third embodiment.

When called by the user-side additional processing unit 216, the corresponding range information generating unit 2163 initiates the corresponding range information generating processing described below. Note that values of the object column, the range of values of the object column, and the frequency leveling reference value are input to the corresponding range information generating unit 2163.

First, the corresponding range information generating unit 2163 calculates the frequency (the number of records) for each of the values of the object column (step F501).

Next, the corresponding range information generating unit 2163 divides the range of values of the object column into a plurality of sections and assigns a range label to each of the sections (step F502). At this time, the corresponding range information generating unit 2163 divides the range of the value into the plurality of sections such that a total value of frequencies of a range of values included in each of the sections does not exceed the frequency leveling reference value.

Next, the corresponding range information generating unit 2163 generates the corresponding range information 2621 (step F503). Thereafter, the corresponding range information generating unit 2163 terminates the processing.

Specifically, the corresponding range information generating unit 2163 generates the corresponding range information generating unit 2163 by registering records including the "corresponding range" column, the "range label" column, and the "frequency" column. In addition, the corresponding range information generating unit 2163 stores the generated corresponding range information 2621 in the user-side additional information group 262.

For example in a case where the values as illustrated in FIG. 35 are input, the corresponding range information generating unit 2163 generates the corresponding range information 2621 as illustrated in FIG. 29.

Figure 38:
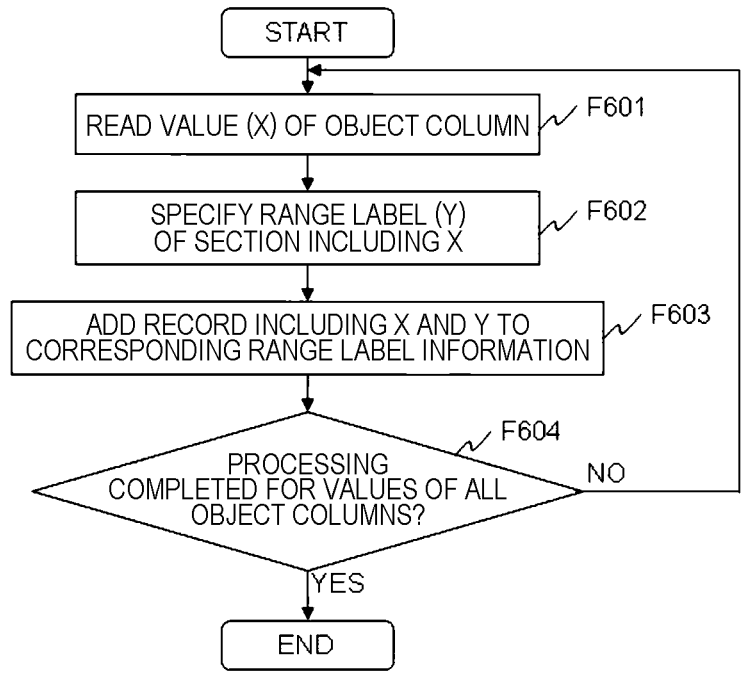
FIG. 38 is a flowchart for explaining corresponding range label information generating processing executed by a corresponding range label information generating unit of the third embodiment.

FIG. 38 is a flowchart for explaining the corresponding range label information generating processing executed by the corresponding range label information generating unit 2164 of the third embodiment.

When called by the user-side additional processing unit 216, the corresponding range label information generating unit 2164 executes the corresponding range label information generating processing described below. Note that plaintext data of the object column and the name of the corresponding range information 2621 before encryption are input to the corresponding range label information generating unit 2164.

First, the corresponding range label information generating unit 2164 reads out one value of the object column and sets the value as X (step F601).

Next, the corresponding range label information generating unit 2164 specifies a range label of a section including X (step F602).

Specifically, on the basis of the name of the corresponding range information 2621 input from the user-side additional processing unit 216, the corresponding range label information generating unit 2164 refers to the "corresponding range" column of the corresponding range information 2621 and specifies records corresponding to the section including X. The corresponding range label information generating unit 2164 reads a value from the "range label" column of the specified record and sets the value as Y.

Next, the corresponding range label information generating unit 2164 adds a record including X and Y to corresponding range label information (step F603). Here, the corresponding range label information is a list of range labels including the object column and is temporarily stored in the memory 210.

Next, the corresponding range label information generating unit 2164 determines whether the processing has been completed for all the values of the object column (step F604).

If it is determined that the processing has not been completed for all the values of the object column, the corresponding range label information generating unit 2164 returns to step F601 and executes similar processing.

If it is determined that the processing has been completed for all the values of the object column, the corresponding range label information generating unit 2164 terminates the corresponding range label information generating processing.

The above is description of the preparatory processing for the range search processing/sort processing.

(3-3) Details of Range Search/Sort Processing

Next, range search processing/sort processing will be described in detail with reference to FIGS. 39, 40, 41, 42, and 43.

Figure 39:
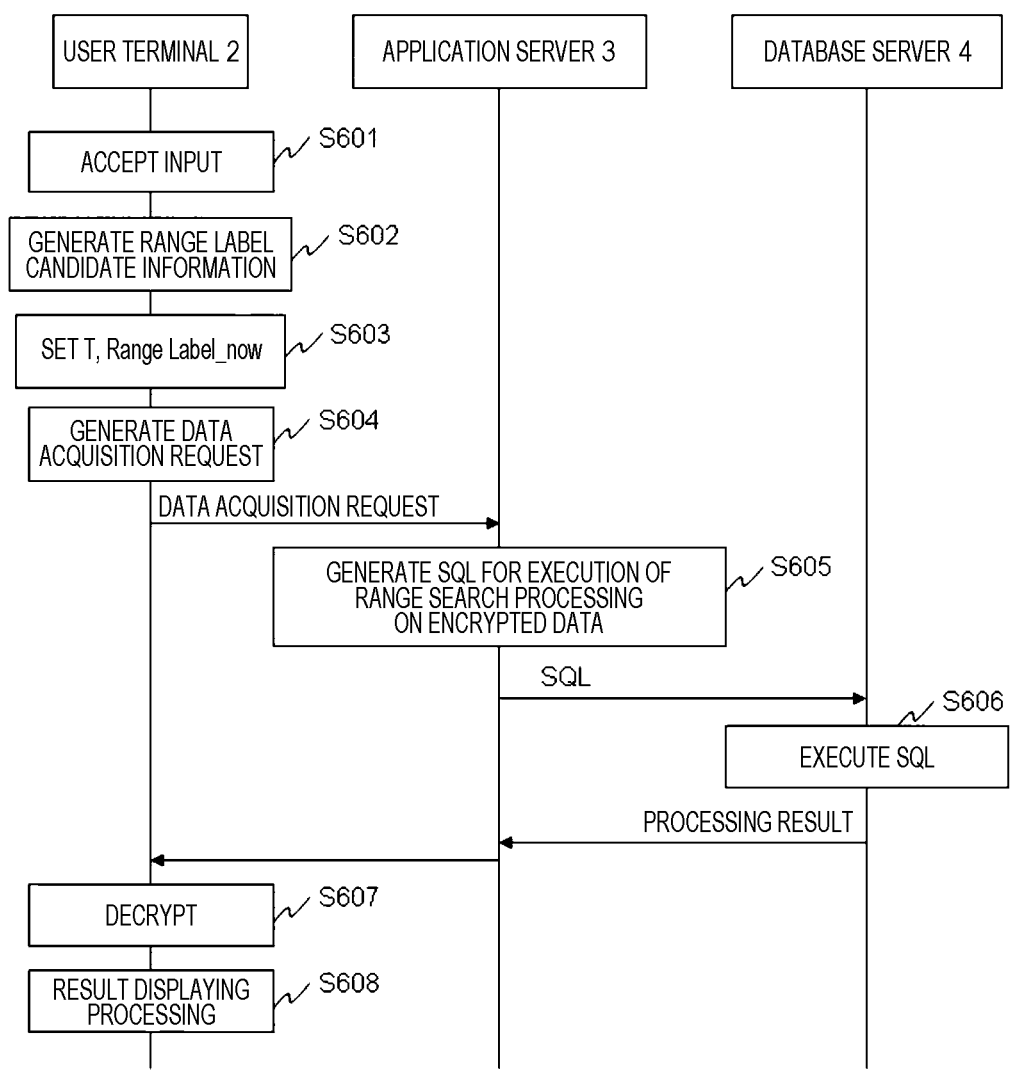
FIG. 39 is a sequence diagram illustrating a flow of range search/sort processing of the third embodiment.

FIG. 39 is a sequence diagram illustrating a flow of the range search processing/sort processing of the third embodiment. FIG. 40 is a diagram illustrating an example of a patient information acquiring screen 2121 of the third embodiment. FIG. 41 is a diagram illustrating an example of a patient information displaying screen 2122 of the third embodiment.

The user terminal 2, the application server 3, and the database server 4 execute the range search processing/sort processing in cooperation with each other. The range search processing/sort processing is initiated when the user terminal 2 accepts input from the user.

First, the user terminal 2 accepts input from the user (step S601).

For example, the user inputs a search range of values of the object column, the number of records (Limit number) displayed on one screen, an order of display of records displayed, and other information by using the patient information acquiring screen 2121 as illustrated in FIG. 40. In a case where a doctor who has saved sensitive information displays a predetermined number of records of patients included in a desired age group on one screen in an ascending order of age, it is assumed that the user terminal 2 is operated.

Here, the patient information acquiring screen 2121 will be described. The patient information acquiring screen 2121 is displayed on the display device 220 by the browser 211.

The patient information acquiring screen 2121 includes a plurality of input forms (P1101), (P1102), (P1103), (P1104), and (P1105) and a plurality of radio buttons (P1106) and (P1107) for accepting input of search conditions. The patient information acquiring screen 2121 further includes an OK button (P1108) and a cancel button (P1109).

The input form (P1101) allows for input of object information of the range search processing. The input form (P1102) allows for input of a lower limit value of a range. The input form (P1103) allows for input of an upper limit value of the range.

The input form (P1104) allows for input of the number of records to be displayed on one screen.

The input form (P1105) allows for input of an object column of sort processing of records. The radio button (P1106) is for selecting sorting processing for rearranging records in an ascending order of values of the column input to the input form (P1105). The radio button (P1106) is for selecting sorting processing for rearranging records in a descending order of values of the column input to the input form (P1105).

The OK button (P1108) is an operation button for confirming input. The cancel button (P1109) is an operation button for canceling confirmation of input.

In a case where the user inputs values only in the input forms (P1101), (P1102), and (P1103) and presses the OK button (P1108), a processing result in which all retrieved records are randomly arranged is output. Alternatively, in a case where the user inputs values only in the input forms (P1104) and (P1105), selects any one of the radio buttons (P1106) and (P1107), and presses the OK button (P1108), a processing result, in which a predetermined number of records are rearranged in a specified order out of records retrieved from the entire range, is output.

The above is description of the patient information acquiring screen 2121. Let us return to the description of FIG. 39.

Next, the user terminal 2 generates range label candidate information (step S602). Specifically, processing as the following is executed.

The user-side additional processing unit 216 refers to the "corresponding range" column of the corresponding range information 2621 and specifies a group of sections in which a search range and a range of values specified by using the patient information acquiring screen 2121 overlap.

The user-side additional processing unit 216 reads out values of the "range label" column and the "frequency" column of records corresponding to sections included in the specified group of sections from the corresponding range information 2621. The user-side additional processing unit 216 further adds records in which the values of the "range label" column and the "frequency" column are associated are added to the range label candidate information in accordance with a specified display order.

Note that the range label candidate information is information is temporarily stored in the memory 210.

For example, in a case where the corresponding range information 2621 illustrated in FIG. 29 is stored in the user-side additional information group 262 and values as illustrated in FIG. 40 are input on the patient information acquiring screen 2121, a group of sections the "age corresponding range" column of which includes "20-29" and "30-39" is specified. In this case, the user-side additional processing unit 216 first adds a record, in which "300" and "2" are associated with each other, to the range label candidate information and then adds records a record, in which "400" and "2" are associated with each other, to the range label candidate information. The above is description of the processing of step S602.

Next, the user terminal 2 sets T and a range label_now as variables (step S603).

Specifically, the user-side additional processing unit 216 sets T and the range label_now. Symbol T is a variable indicating the number of records displayed on one screen. The range label_now is a variable indicating a value of a range label included in the uppermost record of the range label candidate information.

In the case of the range label candidate information exemplified in step S602, "2" is set to T, and "300" is set to the range label_now.

Next, the user terminal 2 generates a data acquisition request (step S604). Specifically, processing as the following is executed.

The user-side additional processing unit 216 specifies a type of operation necessary for acquisition of requested information. The user-side additional processing unit 216 specifies the name of the object information. The user-side additional processing unit 216 further specifies the encrypted corresponding range information 4624 for storing a search query used for the encryption match determining processing. The user-side additional processing unit 216 further inputs T, the range label_now, and the range label candidate information to the range search/sort query generating unit 2165 and instructs execution of range search/sort query generating processing.

The range search/sort query generating unit 2165 generates the range search query information 2103 by executing the range search/sort query generating processing. For example, in a case where T is "2," the range label_now is "300," and the range label candidate information exemplified in step S602 are input, the range search query information 2103 illustrated in FIG. 30 is generated. Note that details of the range search/sort query generating processing will be described with reference to FIG. 42.

The range search/sort query generating unit 2165 transmits the range search query information 2103 to the user-side additional processing unit 216.

The user-side additional processing unit 216 generates a data acquisition request including the type of operation, the name of the object information, identification information of the encrypted corresponding range information 4624, the range search query information 2103, and a read command and transmits the data acquisition request to the application server 3. The above is description of the processing of step S604.

Next, the application server 3 generates SQL for executing range search processing on encrypted data (step S605). Specifically, processing as the following is executed.

When receiving the data acquisition request, the application unit 311 transmits the data acquisition request to the SQL generating unit 312.

The SQL generating unit 312 refers to the SQL definition information 361 and specifies a record, request processing 3612 of which matches the type of operation included in the data acquisition request. In this case, a record a definition ID 3611 of which is "3" is specified.

The SQL generating unit 312 generates SQL on the basis of the name of object information of the range search included in the data acquisition request, the range search query information 2103, and an SQL definition 3613 of the specified record. The SQL generating unit 312 transmits the generated SQL to the application unit 311.

The application unit 311 transmits the SQL to the database server 4 via the database interface unit 313.

In a case where information as illustrated in FIG. 40 is input, the SQL generating unit 312 generates SQL (J) as follows.

SQL (J)

SELECT Patient Number, Name, Age FROM Encrypted Corresponding Range Information

WHERE Encryption Match Determination (Age_Range Label, EncQuery (300))='true';

SQL (J) means to instruct the encryption match determining unit 412 to execute processing and thereby to read out values of the "patient number" column, the "name" column, and the "age" column of a record in which a value of the "age_range label" column matches the search query "EncQuery (300)" from the encrypted corresponding range information 4624. The above is description of the processing of step S605.

Next, when receiving the SQL from the application server 3, the database server 4 executes the range search processing on the basis of the SQL (step S606).

Specifically, the database control unit 411 executes the received SQL and stores an execution result as the temporary information 4103 in the memory 410. The database control unit 411 transmits an execution result including the temporary information 4103 to the application server 3. Here, a case where the received SQL is SQL (J) will be described as an example.

The database control unit 411 calls the encryption match determining unit 412 on the basis of SQL (J). The encryption match determining unit 412 performs encryption match determination on a search query and a value of the "age_range label" column of the encrypted corresponding range information 4624 and outputs the determination result to the database control unit 411.

The database control unit 411 specifies a record that satisfies the condition of the range search processing on the basis of the determination result output from the encryption match determining unit 412. The database control unit 411 stores the temporary information 4103 illustrated in FIG. 33 in the memory 410.

The database control unit 411 transmits a processing result including the temporary information 4103 to the application server 3. The above is description of the processing of step S606.

Next, when receiving the processing result, the user terminal 2 decrypts the processing result (step S607).

Specifically, when receiving the processing result including the temporary information 4103, the user-side additional processing unit 216 acquires key information from the key management unit 215 and transmits the temporary information 4103 and the key information to a decryption unit 213. The decryption unit 213 acquires plaintext data by decrypting values of a column included in the temporary information 4103 using the key information. The decryption unit 213 transmits the plaintext data to the user-side additional processing unit 216.

Next, the user terminal 2 executes result display processing (step S608).

In the result display processing, the user terminal 2 extracts only records requested by the user from the processing result and rearranges the extracted records in a specified order. The browser 211 of the user terminal 2 generates display information for displaying the processing result including the rearranged records and displays the patient information displaying screen 2122 as illustrated in FIG. 41 on the display device 220 on the basis of the display information. Note that details of the result display processing will be described with reference to FIG. 43.

Here, the patient information displaying screen 2122 will be described. The patient information displaying screen 2122 is displayed on the display device 220 by the browser 211.

The patient information displaying screen 2122 includes a list of search results (P1201) and an operation area (P1202). The patient information displaying screen 2122 further includes an OK button (P1203).

The list of search results (P1201) illustrated in FIG. 41 includes a plurality of records including the "patient number" column, the "name" column, and the "age" column. In the list of search results (P1201) illustrated in FIG. 41, two records rearranged in an ascending order of ages of the records are displayed.

The operation area (P1202) is for displaying a record which has not yet been displayed. The OK button (P1203) is an operation button for commanding termination of the display.

The above is description of the patient information displaying screen 2122. Moreover, the above is description of the flow of the range search processing/sort processing.

Figure 42:
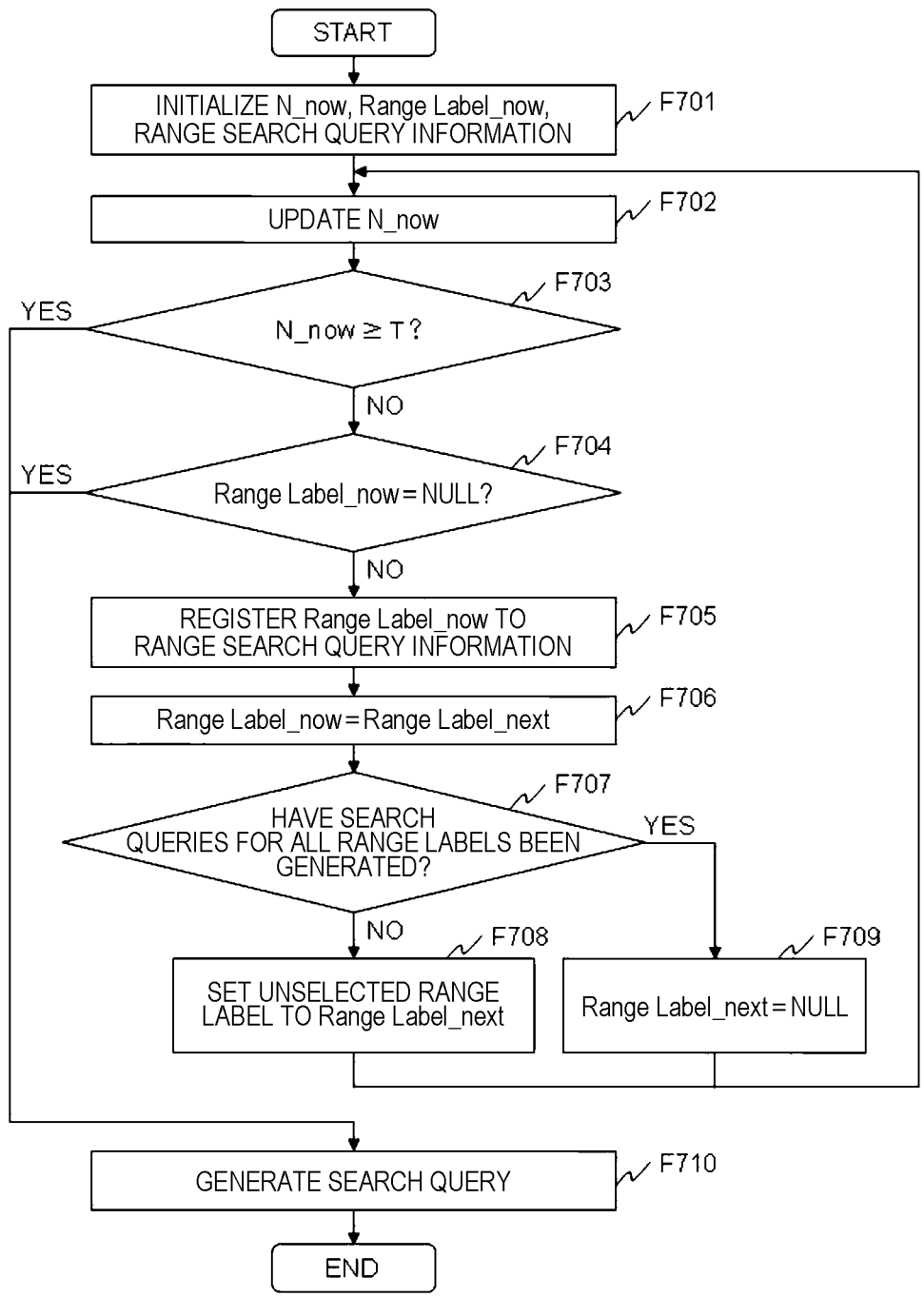
FIG. 42 is a flowchart for explaining range search/sort query generating processing executed by a range search/sort query generating unit of the third embodiment.

FIG. 42 is a flowchart for explaining the range search/sort query generating processing executed by the range search/sort query generating unit 2165 of the third embodiment.

The range search/sort query generating unit 2165 initiates the range search/sort query generating processing which is called by the user-side additional processing unit 216 and is described below. Note that T, the range label_now, and the range label candidate information are input to the range search/sort query generating unit 2165.

First, the range search/sort query generating unit 2165 initializes N_now and range label_next as variables and also initializes the range search query information 2103 (step F701). Specifically, processing as the following is executed.

The range search/sort query generating unit 2165 sets "0" to N_now. The range search/sort query generating unit 2165 further refers to the range label_now and the corresponding range information 2621 and determines whether there is a range label subsequent to a range label set in the range label_now. If there is a range label subsequent to the range label set in the range label_now, the range search/sort query generating unit 2165 sets the subsequent range label to the range label_next. If there is no range label subsequent to the range label set in the range label_now, the range search/sort query generating unit 2165 sets "NULL" to the range label_next.

The range search/sort query generating unit 2165 further generates the range search query information 2103 that is blank. The above is description of the processing of step F701.

Next, the range search/sort query generating unit 2165 updates N_now (step F702).

Specifically, the range search/sort query generating unit 2165 adds a value of the "frequency" column of a record of range label candidate information corresponding to the range label_now to N_now.

Next, the range search/sort query generating unit 2165 determines whether N_now is greater than or equal to T (step F703).

If it is determined that N_now is greater than or equal to T, the range search/sort query generating unit 2165 proceeds to step F710.

If it is determined that N_now is smaller than T, the range search/sort query generating unit 2165 determines whether the range label_next is "NULL" (step F704).

If it is determined that the range label_next is "NULL," the range search/sort query generating unit 2165 proceeds to step F710.

If it is determined that the range label_next is not "NULL," the range search/sort query generating unit 2165 registers a value of the range label_now in the range search query information 2103 (step F705).

Next, the range search/sort query generating unit 2165 sets a value of the range label_next to the range label_now (step F706).

Then, the range search/sort query generating unit 2165 determines whether search queries of all the range labels included in the range label candidate information have been generated (step F707).

If it is determined that search queries of all the range labels included in the range label candidate information has not been generated, the range search/sort query generating unit 2165 updates the range label_next (step F708). Thereafter, the range search/sort query generating unit 2165 returns to step F702 and executes similar processing.

Specifically, the range search/sort query generating unit 2165 selects a range label that has not been selected from the range label candidate information and sets the selected range label to the range label_next. For example, a method of selecting a record subsequent to the range label_now is conceivable.

If it is determined that search queries of all the range labels included in the range label candidate information has been generated, the range search/sort query generating unit 2165 sets "NULL" to the range label_next (step F709). Thereafter, the range search/sort query generating unit 2165 returns to step F702 and executes similar processing.

If YES in step F703 or YES in step F704, the range search/sort query generating unit 2165 generates a search query of each of the range labels registered in the range search query information 2103 (step F710). Thereafter, the range search/sort query generating unit 2165 terminates the processing. Specifically, processing as the following is executed.

The range search/sort query generating unit 2165 acquires key information from the key management unit 215 and transmits the respective range labels registered in the range search query information 2103 and the key information to the encrypted search query generating unit 214.

The encrypted search query generating unit 214 generates a search query by encrypting each of the range labels using the key information and transmits the search queries to the range search/sort query generating unit 2165.

The range search/sort query generating unit 2165 replaces the range labels registered in the range search query information 2103 with the search queries. As a result, the range search query information 2103 for acquiring records, the number of which is less than or equal to a specified number of display items, is generated. The above is description of the processing of step F710.

Figure 43:
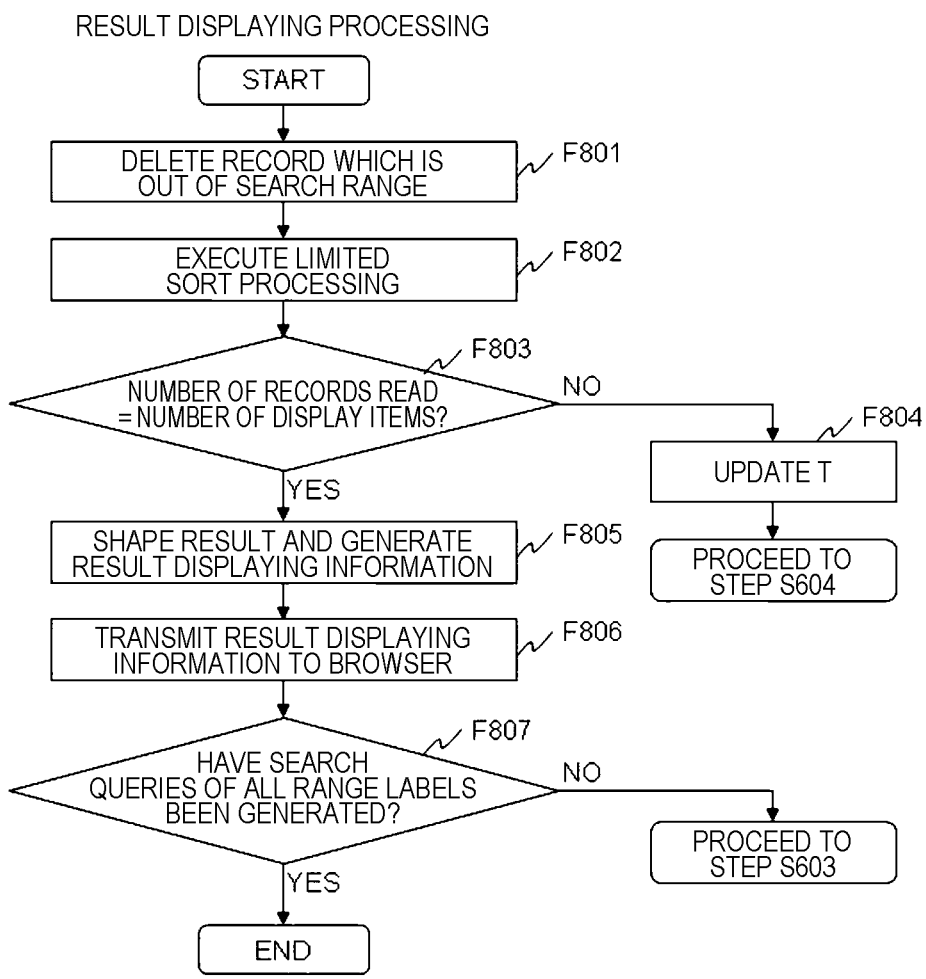
FIG. 43 is a flowchart for explaining an example of result display processing executed by a user terminal of the third embodiment.

FIG. 43 is a flowchart for explaining an example of the result display processing executed by the user terminal 2 of the third embodiment.

First, the user-side additional processing unit 216 deletes records outside the search range from records included in the processing result (step F801). Specifically, processing as the following is executed.

The user-side additional processing unit 216 calls the out-of-range data deleting unit 2166. At this time, the user-side additional processing unit 216 inputs the decrypted plaintext data (record group) and the upper limit value and the lower limit value indicating the search range of the object column.

The out-of-range data deleting unit 2166 deletes records not included in the search range and transmits a processing result including records within the search range only to the user-side additional processing unit 216. The above is description of the processing of step F801.

Next, the user-side additional processing unit 216 executes limited sort processing with on the records included in the processing result (step F802). Specifically, processing as the following is executed.

The user-side additional processing unit 216 calls the limited sort processing unit 2167. At this time, the user-side additional processing unit 216 inputs the processing result to be stored in the memory 210, the number of display items, and a display order to the limited sort processing unit 2167.

The limited sort processing unit 2167 rearranges the records included in the processing result in accordance with the display order. The limited sort processing unit 2167 reads records by the number of display items from the processing result with rearranged records and transmits the read records to the user-side additional processing unit 216. The above is description of the processing of step F802.

Next, the user-side additional processing unit 216 determines whether records, the number of which corresponds to the specified number of display items, have been read out (step F803).

If it is determined that records, the number of which corresponds to the specified number of display items, have not been read out, the user-side additional processing unit 216 updates the variable T (step F804). Thereafter, the user-side additional processing unit 216 returns to step S604 and executes similar processing.

Specifically, the user-side additional processing unit 216 sets, to T, a value derived by subtracting the number of records read out from the specified number of displayed items.

If it is determined that records, the number of which corresponds to the specified number of display items, have been read out, the user-side additional processing unit 216 shapes the processing result into a predetermined data format and thereby generates result displaying information (step F805).

Next, the user-side additional processing unit 216 transmits the result displaying information to the browser 211 (step F806). The browser 211 displays the patient information displaying screen 2122 on the display device 220 on the basis of the result displaying information.

Next, the user-side additional processing unit 216 determines whether search queries of all the range labels included in the range label candidate information have been generated (step F807).

If it is determined that search queries of all the range labels included in the range label candidate information have not been generated, the user-side additional processing unit 216 returns to step S603 and executes similar processing.

If it is determined that search queries of all the range labels included in the range label candidate information have been generated, the user-side additional processing unit 216 terminates the result display processing.

The above is description of the range search/sort processing.

(3-4) Effect of Third Embodiment

As described above, in the concealed database system 1 of the third embodiment, in a case where a search condition including a range of values of a desired column is accepted on the basis of the corresponding range information 2621, the encrypted corresponding range information 4626, and the SQL definition information 361, a search result including information included in the specified range is transmitted to the user terminal 2 without decryption of encrypted information. Therefore, it is possible to implement a concealed database system capable of executing a database operation command for acquiring a record included in a specified range from a desired table while confidentiality of data is maintained.

Moreover, in the concealed database system 1 of the third embodiment, on the basis of the corresponding range information 2621, the encrypted corresponding range information 4626, and the SQL definition information 361, a processing result of a predetermined number of records is transmitted to the user terminal 2, and the records rearranged into a predetermined order are displayed. Therefore, it is possible to implement a concealed database system capable of executing a database operation command for acquiring a predetermined number of records sorted by a specified order from a predetermined table while confidentiality of data is maintained.

Note that the configuration for implementing sort processing may be added to the concealed database systems 1 of the first embodiment and second embodiment.

As illustrated in the first to third embodiments, the concealed database systems 1 of the present invention implement processing of a data acquisition request involving data processing in a flow as follows.

When having accepted a data acquisition request including plaintext data, a user terminal 2 converts the data acquisition request into a data acquisition request including encrypted data using an user-side additional information group 262. In addition, the user terminal 2 transmits a processing command for processing encrypted data to an application server 3 on a cloud side via a user internal network 5 and an external network.

On the basis of SQL definition information 361, the application server 3 generates SQL including operation on the encrypted data from the data acquisition request including the encrypted data and transmits the SQL to a database server 4.

When receiving the SQL from the application server 3, the database server 4 executes acquisition processing of the encrypted data on the basis of the SQL and a database-side additional information group 462. The database server 4 transmits the processing result including the acquired encrypted data to the user terminal 2 via the application server 3.

The user terminal 2 decrypts the processing result including the encrypted data and executes predetermined processing and thereby acquires desired plaintext data.

As described above, since plaintext data is not transmitted to the application server 3 nor the database server on the cloud, the user terminal 2 can acquire a result of combined information acquiring processing, a processing result of partial match search, a processing result of range search, and a result of sort processing while confidentiality of data is maintained.

In the first to third embodiments, the application server 3 and the database server 4 are separate devices; however, the functions thereof may be integrated in one device.

Note that the present invention is not limited to the aforementioned embodiments but may include various variations. Moreover, for example the aforementioned embodiments are described in detail in order to facilitate understanding of the present invention and thus the present invention is not necessarily limited to embodiments including all of the configurations having been described. Furthermore, a part of a configuration of each of the embodiments may be added to another configuration, deleted, or replaced with another configuration.

In addition, a part or all of the aforementioned respective configurations, functions, processing units, processing means, or the like may be implemented by hardware by, for example designing by an integrated circuit. Also, the present invention can be implemented by a program code of software which implements the functions of an embodiment. In this case, a storage medium recording the program code is provided to a computer, and a CPU included in the computer reads out the program code stored in the storage medium. In this case, the program code read from the storage medium itself implements the functions of the embodiments described above, and thus the program code itself and the storage medium storing the program code are included in the present invention. As such a storage medium for supplying the program code, for example a flexible disk, a CD-ROM, a DVD-ROM, a hard disk, a solid state drive (SSD), an optical disk, a magneto-optical disk, a CD-R, a magnetic tape, a nonvolatile memory card, a ROM, or the like is used.

In addition, the program code for implementing the functions described in the embodiments can be implemented by a wide range of programs or script languages such as assembler, C/C++, perl, Shell, PHP, and Java.

Alternatively, the program code of the software implementing the functions of the embodiments may be distributed via a network for the program code to be stored in a storage means such as a hard disk or a memory of a computer or a storage medium such as a CD-RW or a CD-R, and a CPU included in the computer may read and execute the program code stored in the storage means or the storage medium.

In the aforementioned embodiments, only control lines or data lines that are considered necessary for the purpose of description are illustrated and thus all of control lines or data lines in a product are not always illustrated. All of the configurations may be mutually connected.

The invention claimed is:

1. A database system, comprising: a database server for storing registration information including one or more pieces of encrypted data encrypted using a probabilistic encryption method; and a terminal for transmitting a data acquisition request for acquiring the encrypted data from the database server, wherein the probabilistic encryption method is an encryption method in which the encrypted data is generated such that a data value before encryption is different for each encryption processing, the terminal comprises:

an encryption unit for encrypting data to be stored in the database server in accordance with the probabilistic encryption method using a mask based on a hash value and an output value of a homomorphic function;

a decryption unit for decrypting the encrypted data;

an encrypted search query generating unit for generating an encrypted search query obtained by encrypting a search query used for retrieving the encrypted data in accordance with the probabilistic encryption method using the mask using the homomorphic function for outputting a same value from a plurality of different input values; and an additional processing unit for encrypting a search condition of a plaintext and transmitting the data acquisition request including the encrypted search condition, the database server holds:

database operation command definition information for storing, for each type of search processing, a definition pattern for converting the data acquisition request into a database operation command to be processed by the database server; and search additional information for each type of the search processing, the database server comprises:

a database operation command generating unit for generating the database operation command by converting the data acquisition request received from the terminal on the basis of the database operation command definition information;

a database control unit for acquiring the requested encrypted data by using the database operation command and the search additional information; and an encryption match determining unit for determining the encrypted data that matches the encrypted search query using the search additional information, the additional processing unit generates a data acquisition request for performing the search processing using the search additional information, the database control unit:

calls the encryption match determining unit upon execution of the database operation command;

acquires encrypted data satisfying the search condition on the basis of a processing result of the encryption match determining unit; and transmits a processing result including the acquired encrypted data to the terminal, and the decryption unit decrypts the encrypted data included in the processing result, wherein the search processing using the search additional information is at least one of combined information acquiring processing of acquiring the encrypted data from combined information in which two pieces of registration information including the registration information as combination objects are combined, partial match search processing of acquiring the encrypted data that partially matches a search term from the registration information, and range search processing of acquiring the encrypted data included in a desired range.

2. The database system according to claim 1, wherein the registration information includes one or more records including one or more columns storing the encrypted data, the combined information acquiring processing is processing of acquiring one or more pieces of encrypted data including the encrypted data from a record included in the combined information, the database server holds encrypted combined information used in the combined information acquiring processing as the search additional information, the encrypted combined information includes the encrypted search query for specifying records to be combined from the two pieces of registration information as the combination objects, and the database operation command generating unit refers to the encrypted combined information and generates a first database operation command for combining the records which are included in the two pieces of registration information as the combination objects and match the encrypted search query.

3. The database system according to claim 2, wherein the additional processing unit:

selects one piece of registration information from the two pieces of registration information as the combination objects;

acquires the encrypted data to be stored in a combination object column of the selected registration information from the database server; and instructs the decryption unit to decrypt the encrypted data, the encrypted search query generating unit generates a first encrypted search query from the decrypted data, the additional processing unit transmits a first generation request for generating the encrypted combined information by adding a column for storing the first encrypted search query to the selected registration information, the database operation command generating unit generates a second database operation command from the first generation request, and the database control unit generates the encrypted combined information on the basis of the second database operation command.

4. The database system according to claim 3, wherein the additional processing unit;

acquires the number of records of each of the two pieces of registration information as the combination objects; and selects one piece of the registration information having a small number of records as the registration information to which the column for storing the first encrypted search query is to be added.

5. The database system according to claim 1, wherein the registration information includes one or more records including one or more columns for storing the encrypted data, the partial match search processing is processing of retrieving a record, storing encrypted data partially matching a search term, from the registration information and acquiring one or more pieces of encrypted data including the encrypted data from the retrieved record, the database server holds encrypted partial information used in the partial match search processing as the search additional information, the encrypted partial information includes encrypted partial data generated by encryption of first partial data obtained by dividing, into a predetermined granularity, plaintext data before encryption of the encrypted data stored in an object column of the registration information to be retrieved and identification information of the encrypted data, the additional processing unit generates a plurality of pieces of first partial data including the first partial data by dividing the search term into a predetermined granularity, the encrypted search query generating unit generates a plurality of second encrypted search queries from the plurality of pieces of first partial data, the additional processing unit transmits the data acquisition request including the plurality of second encrypted search queries, and the database operation command generating unit generates a third database operation command for retrieving a record including the encrypted partial data of the encrypted partial information that matches each of the plurality of second search queries.

6. The database system according to claim 5,
wherein the third database operation command includes a fourth database operation command for retrieving a record matching one of the second search queries from the encrypted partial information and acquiring identification information of the encrypted data included in the retrieved record and a fifth database operation command for retrieving a record included in the registration information as a search object on the basis of identification information of the encrypted data included in the record retrieved from the encrypted partial information.

7. The database system according to claim 5,
wherein the additional processing unit:
acquires the encrypted data to be stored in the object column from the registration information as the search object;
instructs the decryption unit to decrypt the encrypted data; and
generates a plurality of pieces of second partial data by dividing the decrypted data into a predetermined granularity,
the encrypted search query generating unit generates the plurality of second encrypted search queries from the plurality of pieces of second partial data,
and transmits a second generation request for generating the encrypted partial information by associating identification information of each of the plurality of pieces of second encrypted data and the plurality of second encrypted search queries,
the database operation command generating unit generates a fifth database operation command from the second generation request, and
the database control unit generates the encrypted combined information on the basis of the fifth database operation command.

8. The database system according to claim 7,
wherein the additional processing unit generates the first partial data and the second partial data on the basis of an N-gram method.

9. The database system according to claim 1,
wherein the registration information includes one or more records including one or more columns for storing the encrypted data,
the range searching processing is processing of retrieving a record, in which the encrypted data stored in an object column is included in a specified range, from object registration information and acquiring one or more pieces of encrypted data including the encrypted data from the retrieved record,
the database server holds encrypted corresponding range information used in the range search processing,
the terminal holds corresponding range information for generating a third encrypted search query,
the encrypted corresponding range information includes an encrypted label in which identification information of record included in the object registration information and a label for identifying a range, in which the encrypted data included in the object column of the record included in the object registration information is included, are encrypted,
the corresponding range information includes sections obtained by dividing a range of values of the object column and the label,
the additional processing unit:
refers to the corresponding range information and identifies one of the sections that overlaps with a specified range;
generates the third encrypted search query from the labels corresponding to the identified section; and
transmits the data acquisition request including the third encrypted search query, and
the database operation command generating unit generates a sixth database operation command for retrieving a record included in the encrypted corresponding range information in which the encrypted label matches the third encrypted search query.

10. The database system according to claim 9,
wherein the record included in the corresponding range information includes a frequency indicating the number of records which are included in the object registration information and have a value included in the section, and
the additional processing unit specifies a predetermined number of sections including the section such that the number of output records is smaller than a specified number on the basis of the frequency included in the record included in the corresponding range information.

11. The database system according to claim 9,
wherein the additional processing unit:
instructs the decryption unit to decrypt the encrypted data to be stored in the object column of the record acquired from the database server; and
deletes a record not included in the specified range from the record acquired from the database server on the basis of the decrypted data.

12. The database system according to claim 1,
wherein the additional processing unit rearranges the encrypted data acquired from the database server in a predetermined order.

13. A data retrieval method in a database system, the database server comprising: a database server for storing registration information including one or more pieces of encrypted data encrypted using a probabilistic encryption method; and a terminal for transmitting a data acquisition request for acquiring the encrypted data from the database server,
wherein the probabilistic encryption method is an encryption method in which the encrypted data is generated such that a data value before encryption is different for each encryption processing,
the terminal comprises:
an encryption unit for encrypting data to be stored in the database server in accordance with the probabilistic encryption method using a mask based on a hash value and an output value of a homomorphic function;
a decryption unit for decrypting the encrypted data;
an encrypted search query generating unit for generating an encrypted search query obtained by encrypting a search query used for retrieving the encrypted data in accordance with the probabilistic encryption method using the mask using the homomorphic function for outputting a same value from a plurality of different input values; and
an additional processing unit for encrypting a search condition of a plaintext and transmitting the data acquisition request including the encrypted search condition,
the database server holds:
database operation command definition information for storing, for each type of search processing, a definition pattern for converting the data acquisition request into a database operation command to be processed by the database server; and search additional information for each type of the search processing, the database server comprises:

a database operation command generating unit for generating the database operation command by converting the data acquisition request received from the terminal on the basis of the database operation command definition information;

a database control unit for acquiring the requested encrypted data by using the database operation command and the search additional information; and an encryption match determining unit for determining the encrypted data that matches the encrypted search query using the search additional information, the data retrieval method comprises;

a step of accepting the search condition by the additional processing unit;

a step of generating, by the additional processing unit, a data acquisition request for performing the search processing using the search additional information on the basis of the search condition;

a step of transmitting, by the additional processing unit, the data acquisition request to the database server;

a step of calling, by the database control unit, the encryption match determining unit when the database operation command generated by the database operation command is executed;

a step of acquiring, by the database control unit, encrypted data satisfying the search condition on the basis of a processing result of the encryption match determining unit;

a step of transmitting, by the database control unit, a processing result including the acquired encrypted data to the terminal;

a step of decrypting, by the decryption unit, the encrypted data included in the processing result; and a step of generating, by the additional processing unit, display information for presenting the decrypted data, wherein the search processing using the search additional information is at least one of combined information acquiring processing of acquiring the encrypted data from combined information in which two pieces of registration information including the registration information as combination objects are combined, partial match search processing of acquiring the encrypted data that partially matches a search term from the registration information, and range search processing of acquiring the encrypted data included in a desired range.

* * * * *